(12) United States Patent
Son et al.

(10) Patent No.: US 8,996,184 B2
(45) Date of Patent: Mar. 31, 2015

(54) APPARATUS AND METHOD FOR ENERGY MANAGEMENT

(75) Inventors: Dong Min Son, Suwon (KR); Jae Seong Park, Daejeon (KR); Jung Hwan Oh, Seoul (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 283 days.

(21) Appl. No.: 13/101,974

(22) Filed: May 5, 2011

(65) Prior Publication Data
US 2011/0282510 A1 Nov. 17, 2011

(30) Foreign Application Priority Data

May 13, 2010 (KR) .................. 10-2010-0045122
May 20, 2010 (KR) .................. 10-2010-0047533
May 20, 2010 (KR) .................. 10-2010-0047535

(51) Int. Cl.
*G05B 19/00* (2006.01)
*G06Q 50/06* (2012.01)
*G06Q 30/02* (2012.01)
*G06Q 30/04* (2012.01)

(52) U.S. Cl.
CPC .............. *G06Q 50/06* (2013.01); *Y04S 20/242* (2013.01); *G06Q 30/0283* (2013.01); *G06Q 30/04* (2013.01)
USPC ........................................ 700/291

(58) Field of Classification Search
None
See application file for complete search history.

(56) References Cited

U.S. PATENT DOCUMENTS

| | | | |
|---|---|---|---|
| 4,464,724 A * | 8/1984 | Gurr et al. | 700/291 |
| 2003/0135339 A1* | 7/2003 | Gristina et al. | 702/61 |
| 2006/0106741 A1* | 5/2006 | Janarthanan | 705/412 |
| 2006/0155423 A1* | 7/2006 | Budike, Jr. | 700/286 |
| 2008/0224892 A1* | 9/2008 | Bogolea et al. | 340/870.3 |
| 2010/0114799 A1* | 5/2010 | Black et al. | 705/412 |
| 2010/0138363 A1* | 6/2010 | Batterberry et al. | 705/412 |
| 2010/0198713 A1* | 8/2010 | Forbes et al. | 705/34 |
| 2011/0106327 A1* | 5/2011 | Zhou et al. | 700/291 |

(Continued)

FOREIGN PATENT DOCUMENTS

| | | |
|---|---|---|
| CN | 1585953 | 2/2005 |
| CN | 101604420 | 12/2009 |

(Continued)

OTHER PUBLICATIONS

In the Korean Intellectual Property Office Application Serial No. 10-2010-0047535 Office Action dated Sep. 5, 2011, 6 pages.

(Continued)

*Primary Examiner* — Sean Shechtman
(74) *Attorney, Agent, or Firm* — Lee, Hong, Degerman, Kang & Waimey

(57) ABSTRACT

Provided are an apparatus and a method for energy management. The energy management apparatus includes: a receiving block configured to receive energy use information from at least one sensor; and an estimating block configured to calculate a sum and change of energy use per predetermined time slot from the received energy use information and estimate energy use or energy charge after a certain time based on the calculation of the sum and the change. The method includes: receiving energy use information from at least one sensor; and calculating a sum and change of energy use per hour from the received energy use information and estimating energy use or energy charge after a certain time slot based on the calculation of the sum and the charge.

14 Claims, 31 Drawing Sheets

(56) References Cited

U.S. PATENT DOCUMENTS

2011/0153109 A1* 6/2011 Drake et al. .................. 700/296
2011/0264290 A1* 10/2011 Drew ........................... 700/291

FOREIGN PATENT DOCUMENTS

| | | |
|---|---|---|
| CN | 101673363 | 3/2010 |
| JP | 08-050501 | 2/1996 |
| JP | 11-250137 | 9/1999 |
| JP | 2002-209335 | 7/2002 |
| JP | 2003-061263 | 2/2003 |
| JP | 2008-158701 | 7/2008 |
| JP | 2009-211414 | 9/2009 |
| JP | 2009211414 | 9/2009 |
| JP | 2010-044595 | 2/2010 |
| KR | 1998-0025675 | 7/1998 |

OTHER PUBLICATIONS

In the Korean Intellectual Property Application Serial No. 10-2010-0047533 Office Action dated Mar. 23, 2012, 5 pages.
In the Korean Intellectual Property Office Application Serial No. 10-2010-0045122 Office Action dated Feb. 14, 2012, 5 pages.
In the Japanese Patent Office Application Serial No. 2011-107866 Office Action dated Oct. 30, 2012, 2 pages.
The State Intellectual Property Office of the People's Republic of China Application Serial No. 201110129943.0, Office Action dated Jun. 4, 2013, 6 pages.

* cited by examiner ( 2a )

( 2b )

( 3a )

( 3b )

( 4a )

( 4b )

(5a)

(5b)

( 6a )

( 6b )

( 7a )

( 7b )

( 8a )

( 8b )

( 9a )

( 9b )

( 10a )

( 10b )

( 11a )

( 11b )

( 13a )

( 13b )

( 14a )

( 14b )

( 25a )

( 25b )

( 27a )

( 27b )

( 34a )

( 34b )

( 34c )

APPARATUS AND METHOD FOR ENERGY MANAGEMENT

CROSS-REFERENCE TO RELATED APPLICATION

This application claims the benefit of and right of priority to Korean Patent Application No. 10-2010-0045122 filed May 13, 2010, Korean Patent Application No. 10-2010-0047533 filed May 20, 2010, and Korean Patent Application No. 10-2010-0047535 filed May 20, 2010 the disclosures of which are hereby incorporated herein by reference in their entireties.

TECHNICAL FIELD

The present invention relates to an apparatus and method for energy management and, more particularly, to an apparatus and method for energy management capable of controlling the use of energy more actively through an approaching method for estimating future energy use information according to a trend towards effective use of limited energy source such as development of a technique using a smart grid and a smart meter and changed application to energy billing system.

BACKGROUND ART

Utilities and energies such as electricity, gas and water have been supplied based on maximum demand system until now, and energy charges have been paid by a flat rate schedule.

However, it is recently suggested to enforce changes to billing system for applying a differential rate to an energy bill based on a time slot or a season in order to more effectively use limited energy source and reduce energy consumption.

As a method and a technique for promoting the effective use of energy, a smart grid and a smart meter are focused on.

As a next-generation power network, a smart grid delivers electricity from providers to consumers using two-way real-time information technology to control appliances at consumer homes to save energy, reduce cost, increase reliability and transparency and provide value-added services.

From the point of energy consumer, the smart grid may provide the public with more rational consumption by finding a proper time slot for using energy based on differential energy rate.

A smart meter is an energy meter supported by communicating function that identifies energy consumption in more detail than that of a conventional meter. The smart meter enables a two-way communication between an energy provider and energy consumer via some and a real-time monitoring.

Thus, the smart meter may be used for billing purposes so that it is unnecessary for a meterman to come to read a meter in the house. Since the smart meter may support a real-time check of energy consumption, it is possible to reduce management cost for energy provider, and energy costs for energy consumer.

Further, information related to user energy consumption may be provided via communication networks such as an interne so that a customer may always check the information through various communication devices such as a web, a mobile phone and a television.

If the smart grid and the smart meter are applied to energy system, active energy management is possible in real-time.

However, energy consumption is not one-time or sporadic but continual, and energy is not infinite but limited resources. Thus, information regarding future energy use as well as current situation of energy use may be a critical factor for a rational decision related to energy supply or consumption.

DISCLOSURE OF INVENTION

An embodiment of the present invention is to provide an apparatus and method for energy management, configured to support an active managing approach for energy use and supply by collecting data related to energy and estimating forthcoming energy use and energy cost based on the data.

Embodiments of the present invention provide energy management apparatuses including: a receiving block configured to receive energy use information from at least one sensor; and an estimating block configured to calculate a sum and change of energy use per predetermined time from the received energy use information and estimate energy use or energy charge after a certain time based on the calculation of the sum and the change.

In some embodiments, the estimating block may calculate a sum of energy charge per predetermined time and a variation rate thereof from the received energy use information and may estimate energy use or energy charge after a certain time based on the calculation of the sum and the variation rate.

In other embodiments, the receiving block additionally may receive energy price information over time from a central server or a user; and the estimating block may estimate energy use or energy charge after a certain time on the basis of the energy price information based on time received.

In still other embodiments, the estimating block may estimate a charge amount to be actually charged to a user as the energy charge on the basis of information regarding a charging policy of an energy provider providing the energy; and the information regarding the charging policy of the energy provider may include at least one of a basically-charged basic rate, a tax, and a benefit rate.

In even other embodiments, the energy management apparatuses may further include a device control block configured to control energy supply about at least one appliance according to the energy use or energy charge which the estimating block estimates.

In yet other embodiments, the device control block may transmit a device control signal to a power switching device turning on/off the appliance.

In further embodiments, the device control block may cut off power supply to the appliance according to a load control schedule which a user sets.

In still further embodiments, the energy management apparatuses may further include a transmitting block transmitting at least one of information regarding energy use and energy charge, estimated by the estimating block, to a central server over at least one communication network.

In even further embodiments, the transmitting block may transmits the at least one of information regarding energy use and energy charge, estimated by the estimating block, to a user mobile terminal or an In Home Display (IHD).

In yet further embodiments, the transmitting block may transmit a warning message to the user mobile terminal or the IHD when the energy use or energy charge estimated by the estimating block is greater than a predetermined upper limit value.

In other embodiments of the present invention, energy management methods include: receiving energy use information from at least one sensor; and calculating a sum and change of energy use per hour from the received energy use information and estimating energy use or energy charge after a certain time based on the calculation of the sum and the charge.

In some embodiments, the estimating of the energy use or energy charge may include: calculating a sum of energy charge per hour and a variation rate thereof from the received energy use information; and estimating energy use or energy charge after a certain time based on the calculation of the sum and the variation rate.

In other embodiments, the receiving of the energy use information may include additionally receiving energy price information over time from a central server or a user; and the estimating of the energy use or the energy charge may include estimating energy use or energy charge after a certain time on the basis of the energy price information based on time received.

In still other embodiments, the estimating of the energy use or energy charge may include estimating a charge amount to be actually charged to a user as the energy charge on the basis of information regarding a charging policy of a energy provider providing the energy; and the information regarding the charging policy of the energy provides includes at least one of a basically-charged basic rate, a tax, and a benefit rate.

In even other embodiments, the estimating of the energy use or energy charge may include controlling energy supply to at least one appliance according to the energy use or energy charge.

In yet other embodiments, the controlling of the energy supply may include transmitting a device control signal to a power switching device turning on/off the appliance.

In further embodiments, the controlling of the energy supply may include cutting off energy supply to the corresponding appliance according to a load control schedule which a user sets.

In still further embodiments, the energy management methods may further include transmitting at least one of information regarding the estimated energy use and energy charge over a communication network.

In even further embodiments, the transmitting of the at least one of information may include transmitting at least one of the estimated energy use and energy charge to a user mobile terminal or an IHD.

In yet further embodiments, the transmitting of the at least one of information may include transmitting a warning message to the user mobile terminal or the IHD if the estimated energy use and energy charge is greater than a predetermined upper limit value.

BRIEF DESCRIPTION OF DRAWINGS

The above and other objects and features of the present invention will become apparent from the following description of preferred embodiments taken in conjunction with the accompanying drawings.

DETAILED DESCRIPTION

While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, reference will now be made in detail to various embodiments of the present invention, examples of which are illustrated in the accompanying drawings and described below. In the present invention, energy includes one of electricity, gas, water, and other utilities.

Figure 1:
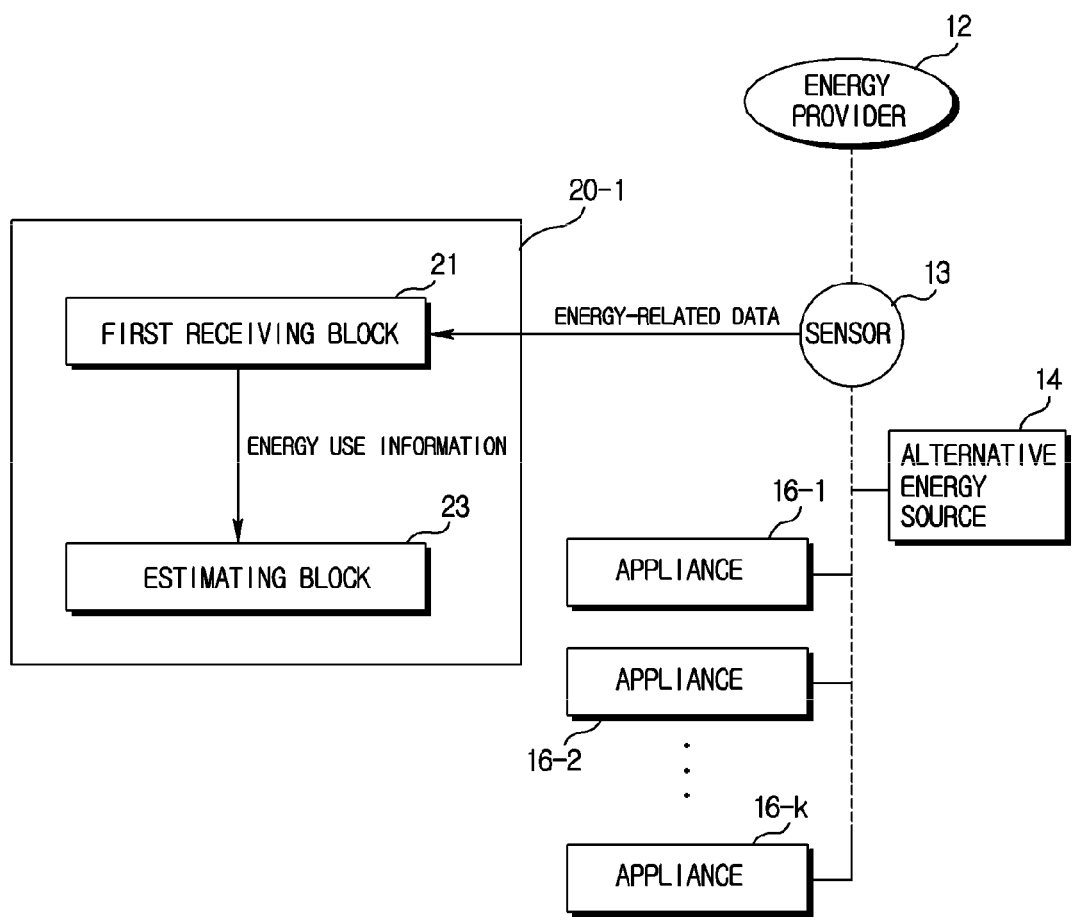
FIG. 1 shows an energy management apparatus according to a first embodiment of the present invention.
Figure 2:
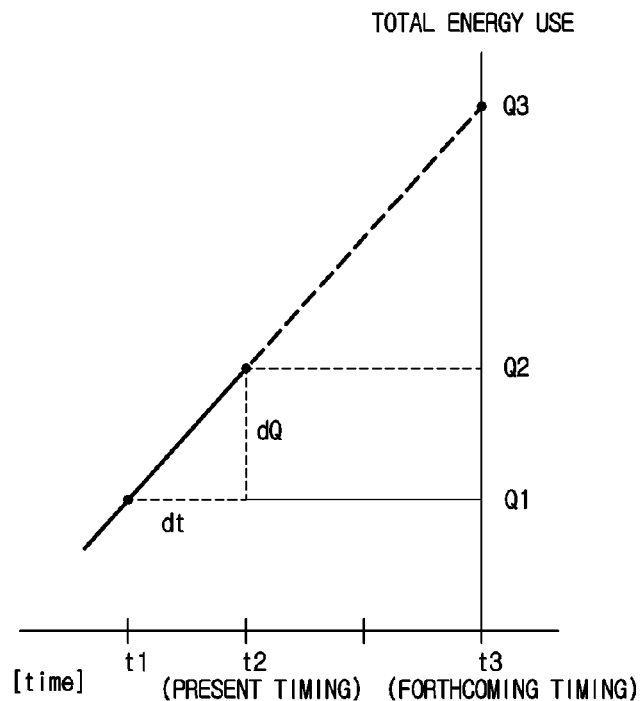
FIGS. 2 to 5 describe methods for estimating energy consumption or cost in the future.
Figure 2:
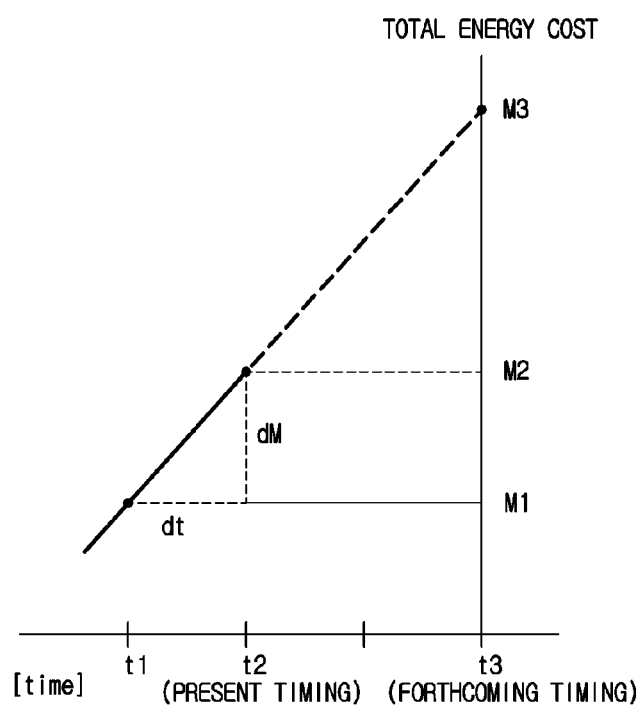
Figure 3:
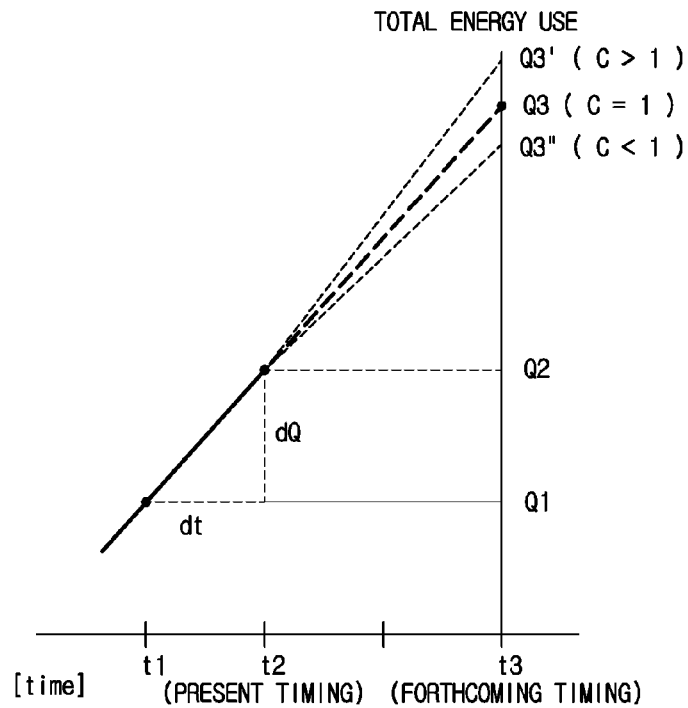
Figure 3:
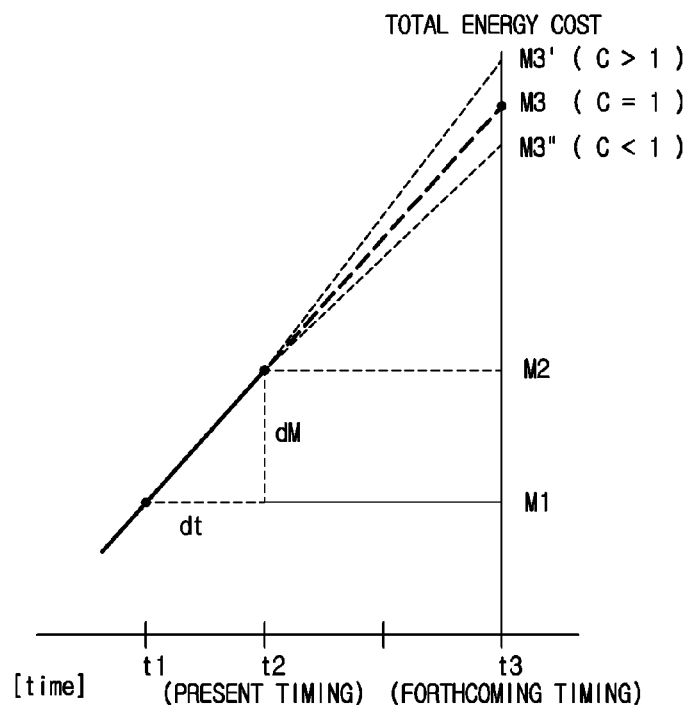
Figure 4:
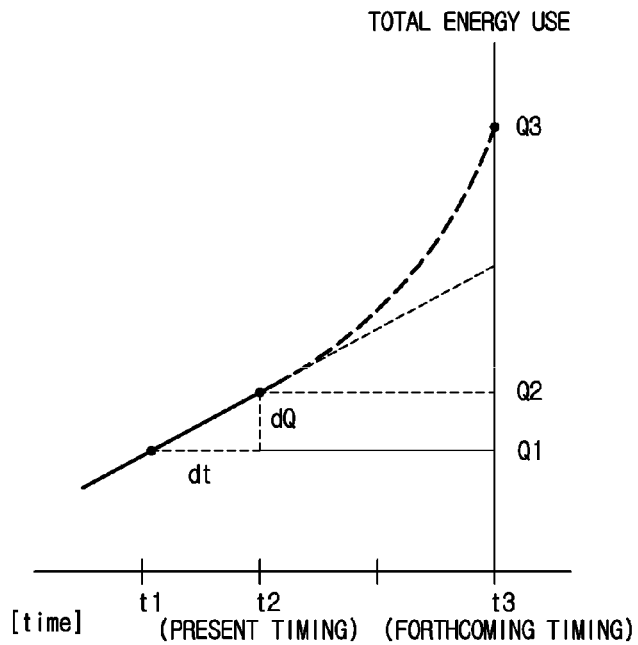
Figure 4:
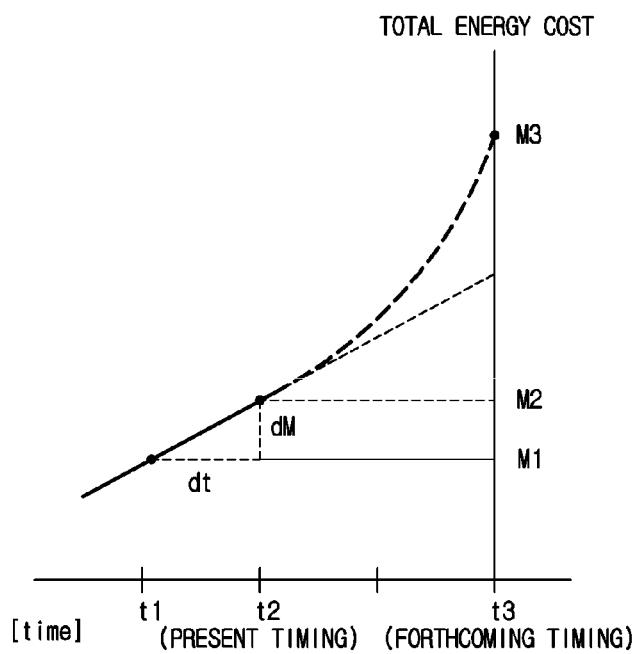
Figure 5:
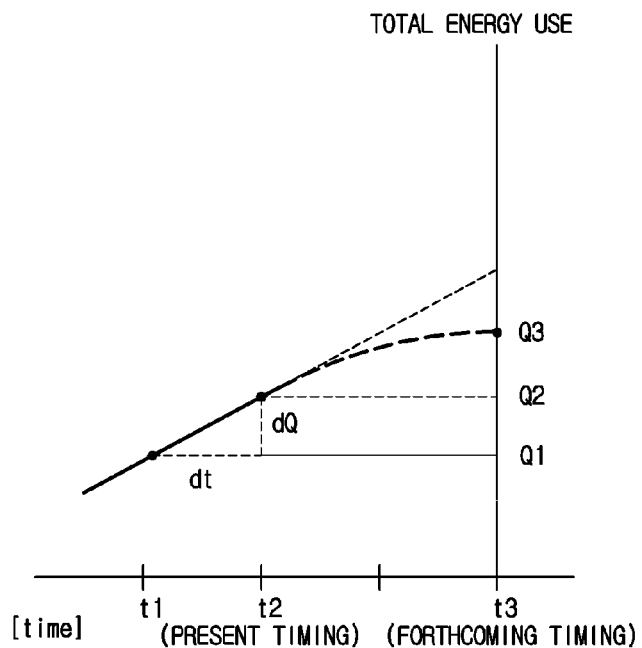
Figure 5:
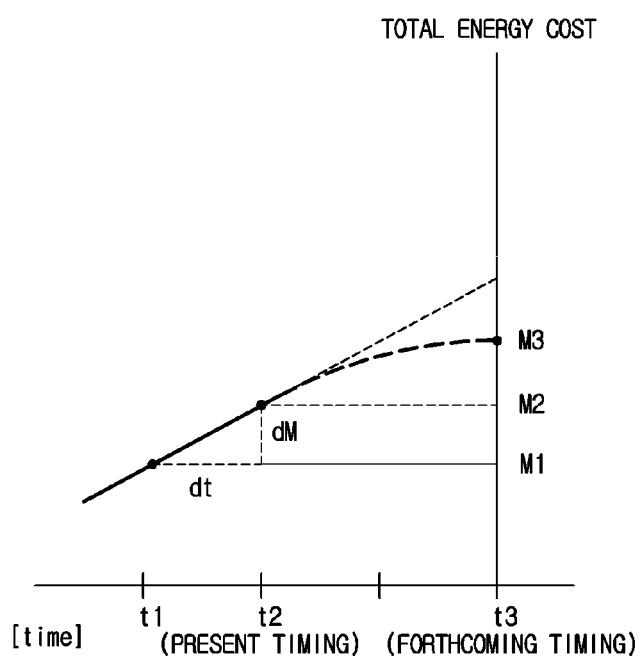

FIG. 1 shows an energy management apparatus 20-1 according to an embodiment of the present invention. The energy management apparatus 20-1 includes a first receiving block 21 and an estimating block 23.

The first receiving block 21 receives data related to energy from at least one sensor 13.

The sensor 13 includes a device monitoring or detecting various information regarding energy use.

Particularly, the sensor 13 may includes an electronic meter measuring an energy use of energy-consumed appliances 16-1 to 16-*k* in a place of energy consumption. Herein, the energy is supplied by an energy provider 12.

For example, a smart meter may be included in the sensor 13. Meanwhile, there may be an alternative energy source 14 in the place of energy consumption.

The energy-related data inputted to the first receiving block 21 from the sensor 13 includes various types of information as occasion demands and may include information of energy consumption.

Although the information of energy consumption may be provided as a total amount of all appliances therein, it may be provided from each appliance if the sensor 13 collects the energy-related data from each appliance.

The estimating block 23 receives energy use information from the first receiving block 21 and calculates a sum and change of energy use per predetermined time and then estimates energy use and energy charges after a predetermined time based on the calculation result.

Herein, the term 'after the predetermined time' means a time in the future when it is required to check energy use or energy charges; and the predetermined time slot may be set by a day, a week, a month, a year or fixed as a certain time in the future.

For example, the certain time is considered as user payment day or the last day of each month.

The sum of energy use per hour is the sum of energy use in each predetermined time. That is, if the predetermined time is an hour unit, the sum of energy use per hour is acquired and if the predetermined time is a day unit, the sum of energy use per day is acquired.

For example, if the total of energy use is Q1 at a previous timing t1 and energy is further consumed by dQ as a corresponding time unit elapses from the previous timing t1, the sum of energy use at a present timing t2 after the corresponding time unit elapses from the previous timing t1 is 'Q1+dQ' and the change of energy use is dQ.

The estimating block 23 may estimate forthcoming energy consumption or energy cost by using the sum and the change of energy use and the energy differential rate through various approaching methods.

FIGS. 2 to 5 describe methods for estimating energy consumption or cost in the future. Referring to FIGS. 2 to 5, various methods of the estimating block 23 to estimate the sum of energy use as energy consumption in the future are described.

It is assumed that total of energy use is Q1 at a previous timing t1, total of energy use is Q2 at the present timing t2, and the sum of energy use is Q3 at a forthcoming timing t3 when a user wants to estimate.

First, the estimating block 23 calculates the change of energy use. Herein, the change of energy use is obtained as 'dQ/dt'; in this case, 'dt' is 't2-t1' and 'dQ' is 'Q2-Q1'.

FIG. 2*a* describes an example of linear method for estimating the sum of energy use. In the linear method, the sum of energy use Q3 at the forthcoming timing t3 may be estimated as a following equation 1.

$$Q3 = Q2 + \frac{dQ}{dt} \times (t3 - t2) \quad \text{[Equation 1]}$$

FIG. 3*a* shows an example of weight method for estimating the sum of energy use by using a weight.

In the weight method, a weight C may be variously used. For instance, the weight C is set as over 1, 1, or under 1 according to the change of energy use. In this case, the sum of energy use Q3 at the forthcoming timing t3 may be estimated as a following equation 2.

$$Q3 = Q2 + C \times \frac{dQ}{dt} \times (t3 - t2) \quad \text{[Equation 2]}$$

FIG. 4*a* shows an example of method for estimating the sum of energy use by using an exponential function. In this method using an exponential function, the sum of energy use Q3 at the forthcoming timing t3 may be estimated as a following equation 3.

$$Q3 = Q2 + (e^{a(t3-t2)} - 1) \quad \text{[Equation 3]}$$

where value 'a' is determined based on the change of energy use.

FIG. 5*a* describes an example of method for estimating the sum of energy use by using a logarithmic function. In this method using a logarithmic function, the sum of energy use Q3 at the forthcoming timing t3 may be estimated as a following equation 4.

$$Q3 = Q2 + \ln(a(t3-t2)+1) \quad \text{[Equation 4]}$$

where value 'a' is determined based on the change of energy use.

As above described, if the sum of energy use is estimated, the estimating block 23 also estimates energy cost or charges in the future through various methods.

The forthcoming energy charges estimated in response to the sum of energy use by the estimating block 23 is a total of energy charges corresponding to an amount of energy used by a user till a predetermined time point in the future.

In a method for estimating a total of energy charges at a forthcoming timing, an estimated sum of energy use and a unit price of energy may be used.

Herein, a unit price of energy in the future may be the same as that at the present or be changed according to a time.

Further, an energy rate may be fixed regardless of total energy use, or be accumulatively varied according to total energy use, i.e., amount of used energy.

An energy management apparatus 20-1 may obtain information of energy rate through various methods and channels.

As one example, the information of energy rate may be received from a central server that an energy provider 12 manages over a communication network. At this point, the central server may transmit information of energy rate over various communication networks such as a wireless mesh, a power line communication network, an interne network, and so on.

As another example, the information of energy rate may be received from a user. In this case, the energy management apparatus 20-1 may provide a user interface (UI) that allows a user to input information of energy rate or may receive information of energy rate that a user inputs through another apparatus such as a personal computer (PC) through communication with the other apparatus.

A detailed method for estimating the sum of future energy charges according to an energy differential rate or schedule is described.

If the energy rates are fixed, information of energy rate may include simple unit prices such as won/KWh (won per kilowatt hour), won/KVarh (won per kilovolt ampere reactive hour), won/KVAh (won per kilovolt ampere hour), and etc. A "won (₩)" used hereinafter is a currency unit of Republic of Korea.

However, the energy rate may have a variety of forms, such as a cumulative use pricing, a time of use pricing, a critical peak pricing, a real-time pricing and so on.

A following Table 1 describes an example of the cumulative use pricing that increases energy rate more highly as total energy use is greater.

TABLE 1

|  | First section | Second section | Third section | Fourth section | ... |
|---|---|---|---|---|---|
| Range [kwh] | ~100 | 101~200 | 201~300 | 301~400 | ... |
| Unit price (won/Kwh) | 55.10 | 113.80 | 168.30 | 248.60 | ... |

FIG. 34a describes an example of the time of use (TOU) pricing. Herein, energy rate is changed in response to a time.

FIG. 34b shows an example of the critical peak pricing (CPP). In a section where energy use is in a critical peak, energy rate is very high.

FIG. 34c describes an example of the real-time pricing (RTP); and, in this case, energy rate is changed real-time.

In a case energy rate is fixed, if the sum of energy use is estimated, total energy cost may be easily estimated by multiplying the sum of energy use with the energy rate.

For example, if a sum of energy use is 210 Kwh and an energy rate is 100 won/Kwh, total energy cost is (210×100) won.

However, if energy rate is changeable based on time or energy use like a cumulative use pricing, a time of use pricing, a critical peak pricing, a real-time pricing and so on, total energy cost should be estimated by applying a differential rate or schedule.

As one of methods for estimating total energy cost, the estimating block 23 recognizes a time slot determined to reflect the change of energy charges from the present timing to a forthcoming timing in the future and the change of energy use in each time slot. For example, if the time slot is 1 hour, the change of energy use dQ is checked every hour. Then, the estimating block 23 multiplies each energy price with each change of energy use dQ in each time slot and adds up all of multiplied values to estimate total energy cost.

When an energy cost is not fixed, the sum of energy cost M3 at the forthcoming timing may be estimated as a following equation 5.

$$M3 = Mc + \sum_{i=1}^{n}(P_i \times dQ_i)$$ [Equation 5]

where 'i' is a positive integer, 'Pi' is an energy price in an $i^{th}$ time slot, and 'dQi' is the change of energy use in an $i^{th}$ time slot.

Herein, 'Mc' is a sum of energy cost at the present timing when estimation is performed. The 'Mc' may be obtained by multiplying each energy price with each change of energy use dQ in each time slot before the present timing and adding up all of multiplied values. The estimating block 23 calculates 'Mc' every time slot and stores the 'Mc'.

Figure 34:
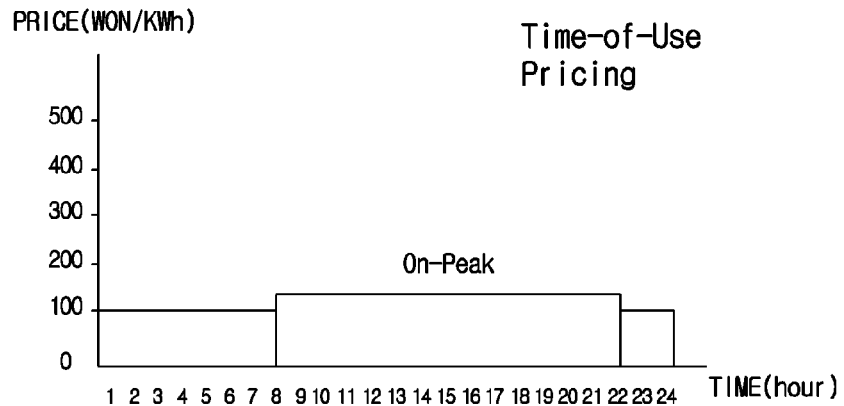
FIG. 34 shows an energy pricing rate.
Figure 34:
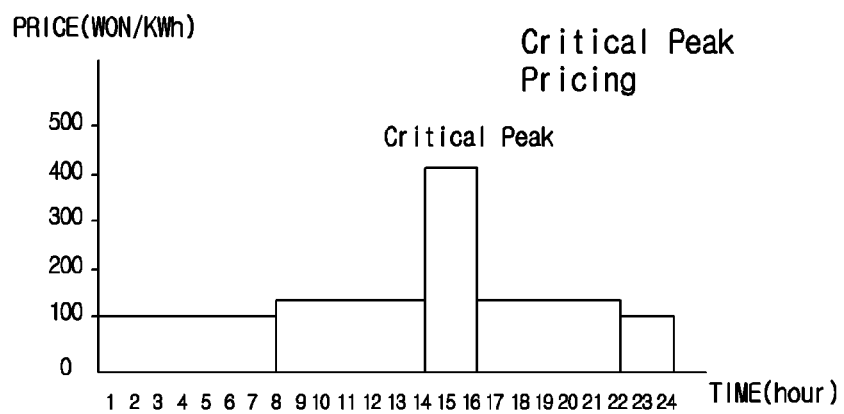
Figure 34:
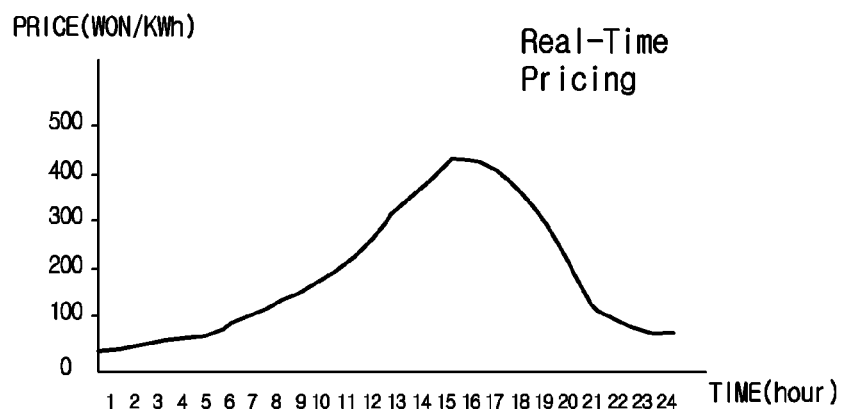

When an energy price is changed according to a time like an example shown in FIG. 34, the energy price corresponding to each time slot may be used as 'Pi'. However, in a case of cumulative use pricing, an energy price is determined according to a sum of energy use.

Since the sum of energy use is already recognized, the estimating block 23 may obtain an energy price applied to each time slot.

Each time slot may be divided every 1 minute, 5 minutes, 10 minutes, 15 minutes, 30 minutes and so on.

The estimating block 23 may store a load profile including sums of energy use or energy charges in each previous time slot as well as each forthcoming time slot in the future.

This information is provided to user mobile terminal or an In Home Display (IHD) device via a transmitting block described hereinafter so that energy consumption or energy cost in the past or future is informed to a user.

As another method for estimating total energy cost based on total estimated energy use, the estimating block 23 uses a bipartite correspondence between the total energy cost and the total energy use.

Figure 6:
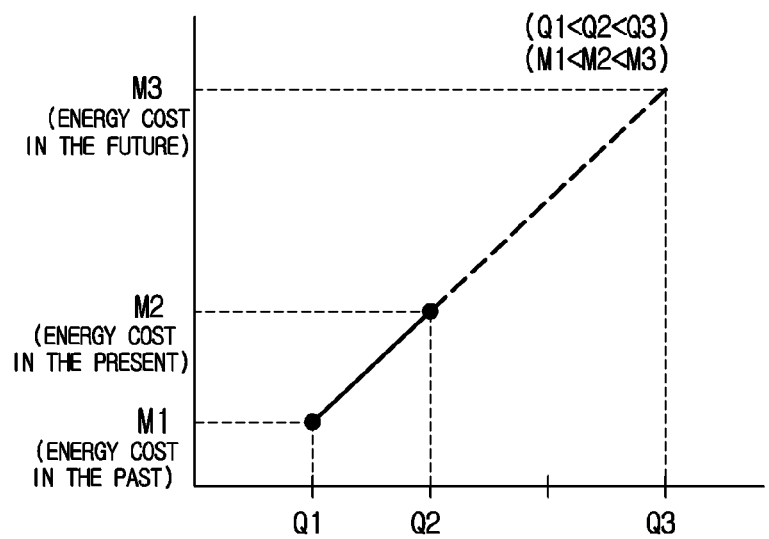
FIGS. 6 and 7 show a method for estimating future energy cost based on estimated energy use.
Figure 6:
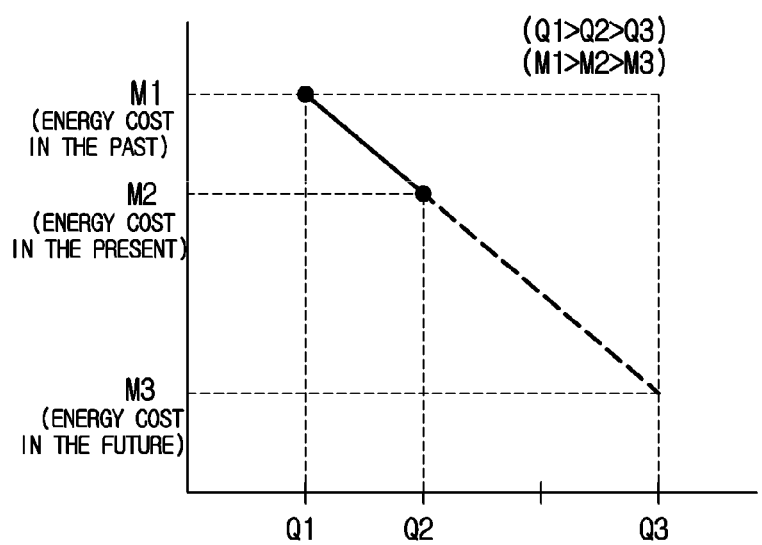
Figure 7:
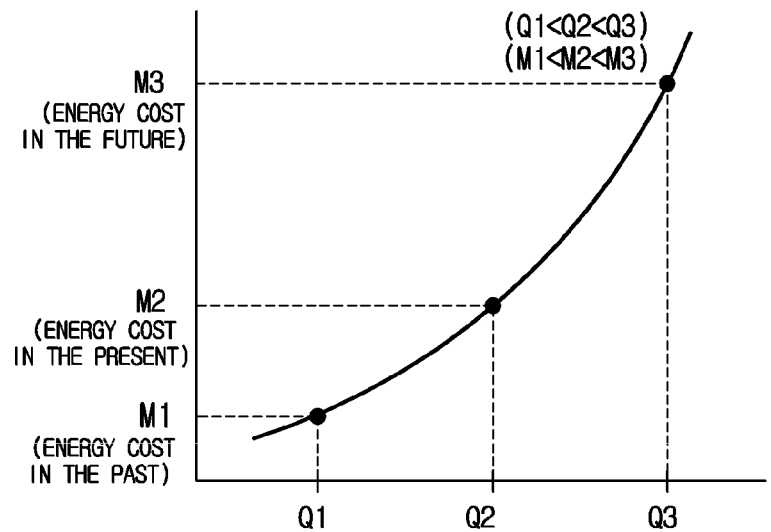
Figure 7:
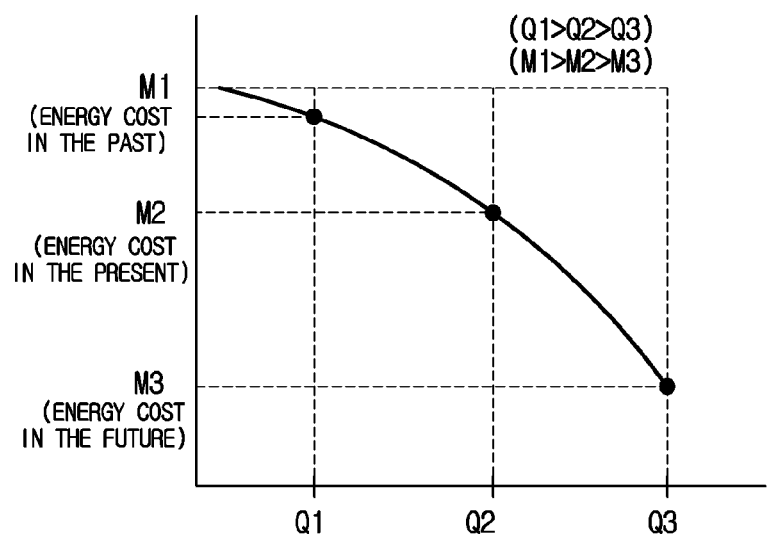
Figure 8:
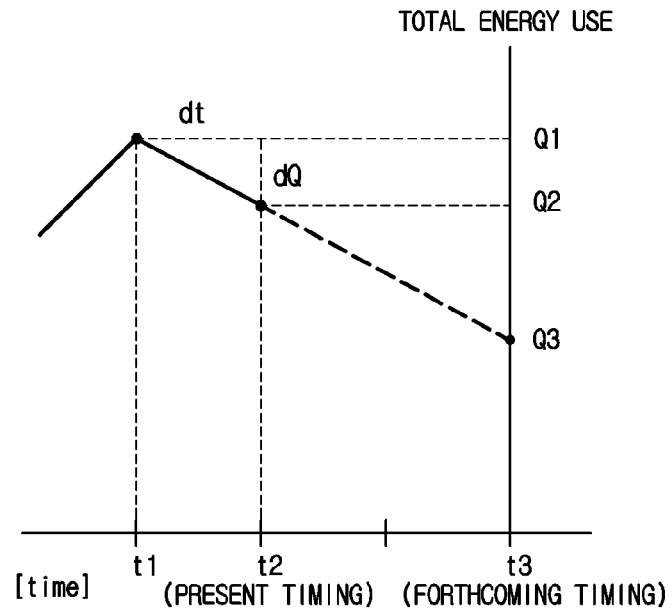
FIGS. 8 to 11 describe reduction of energy use or energy cost by using an alternative energy during a time slot when energy consumption is high.
Figure 8:
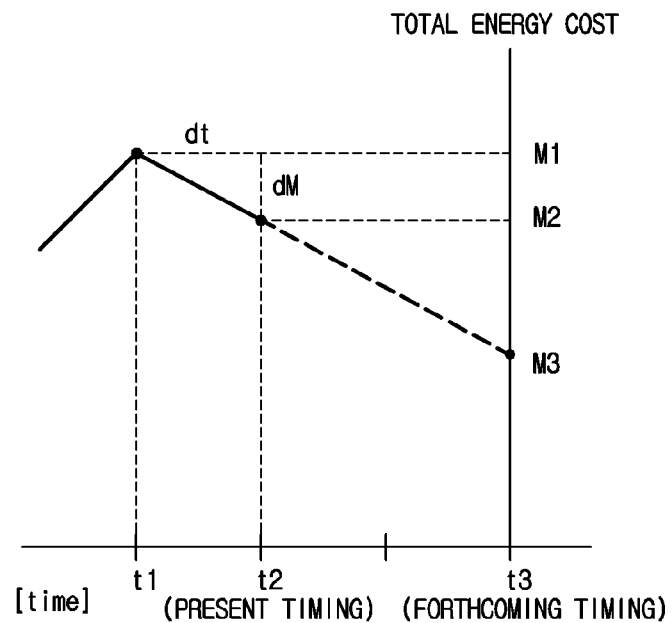
Figure 9:
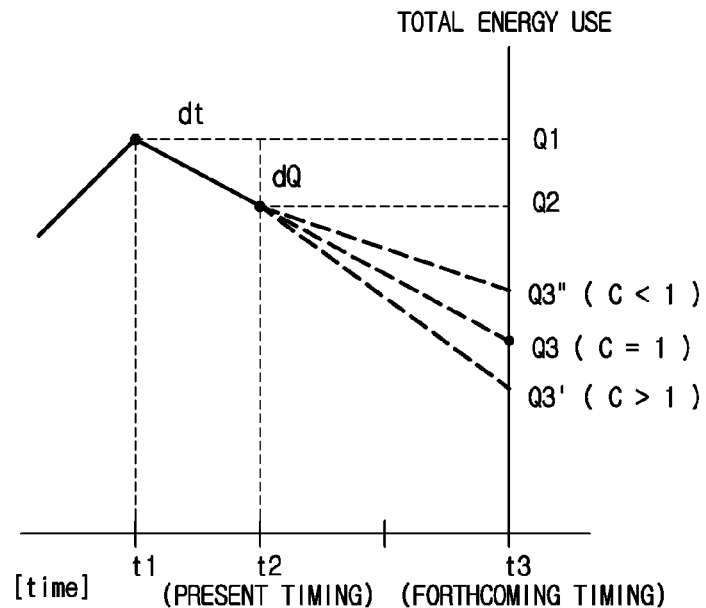
Figure 9:
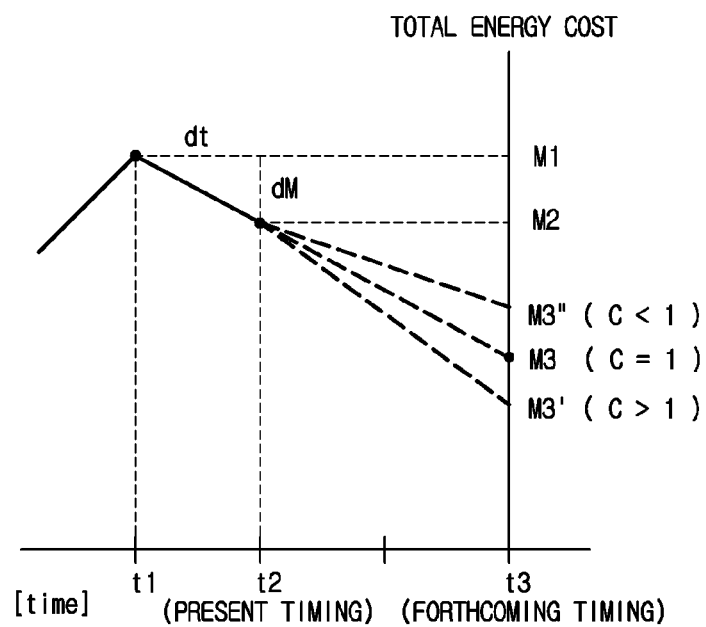
Figure 10:
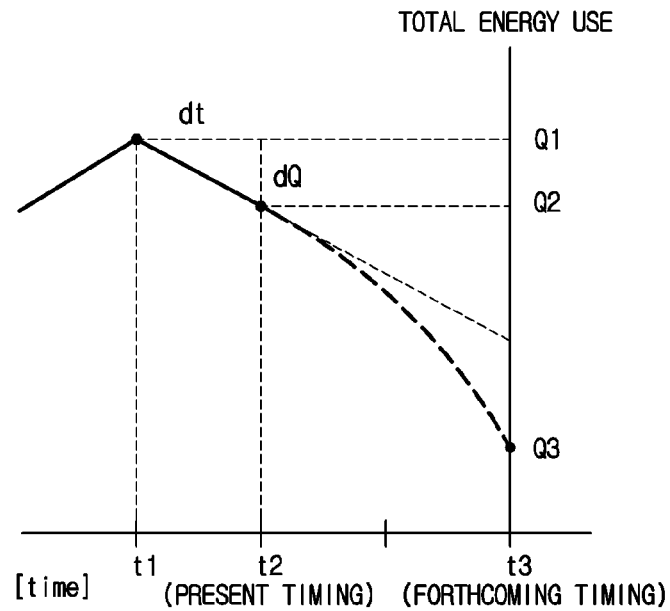
Figure 10:
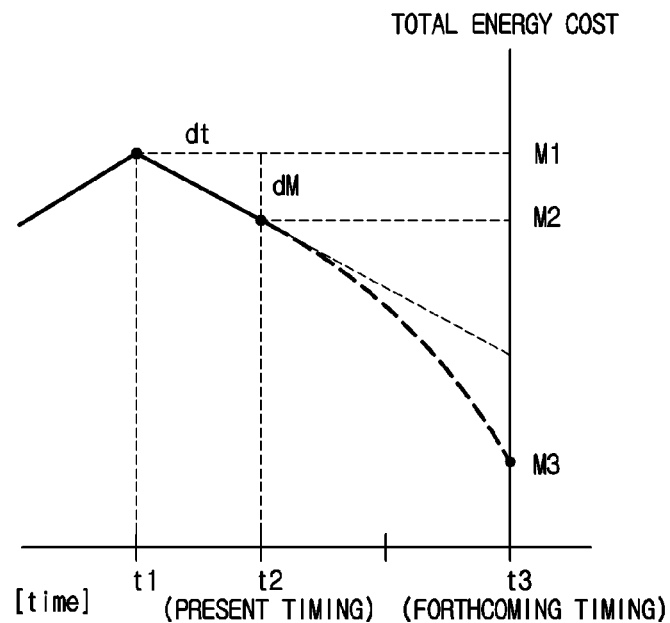
Figure 11:
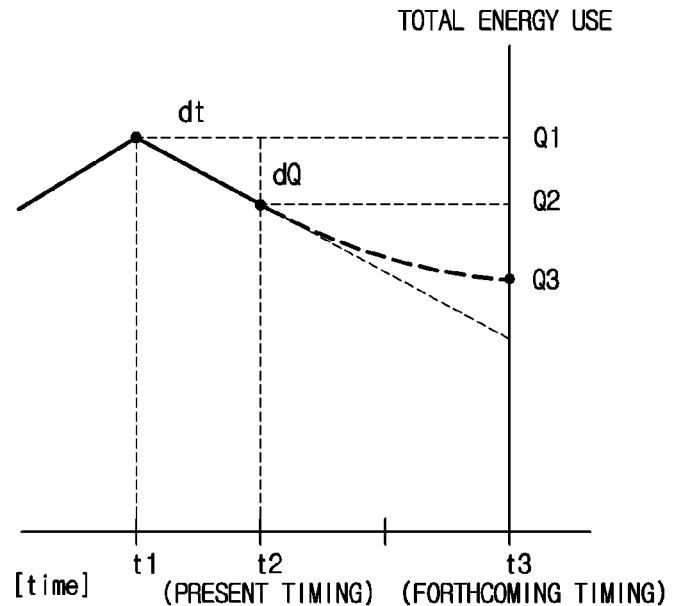
Figure 11:
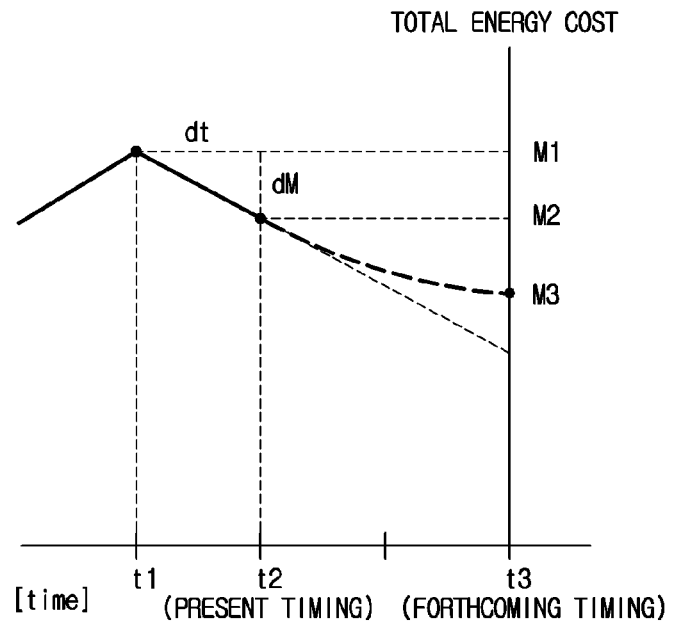

FIGS. 6 and 7 shows a method for estimating energy cost based on estimated energy use. Referring to FIGS. 6 and 7, the method using a bipartite correspondence is described.

It is assumed that total energy cost is M1 when total energy use is Q1 at a previous timing t1; and total energy cost is M2 when total energy use is Q2 at the present timing t2.

FIG. 6a describes an example of liner method for estimating energy cost. If the sum of energy use is Q3 at a forthcoming timing t3 when a user wants to estimate in the future, total energy cost M3 at the forthcoming timing t3 may be estimated as a following equation 6.

$$M3 = M2 + \frac{dM}{dQ} \times (Q3 - Q2)$$ [Equation 6]

FIG. 7a shows an example of method for estimating total energy cost by using an exponential function. In this method using an exponential function, if the sum of energy use is Q3 at a forthcoming timing t3, total energy cost M3 at the forthcoming timing t3 may be estimated as a following equation 3.

$$M3 = M2 + (e^{a(Q3-Q2)} - 1),$$ [Equation 7]

where a value 'a' may be determined based on a cumulative rate or a 'dM/dQ' of energy price.

In relation to the methods of FIGS. 6 and 7, the corresponding relation information between the sum of energy use and the sum of energy charges may be maintained by the estimating block 23 or may be inputted from the central server or user depending on the case. Moreover, the corresponding relation information between the sum of energy use and the sum of energy charges may be expressed as shown in the above Equations or may refer to a Look-Up Table.

FIGS. 8a, 9a, 10a, and 11a are respectively corresponding to FIGS. 2a, 3a, 4a, and 5a. If there is an alternative energy source 14 in the place of energy consumption, it is described that total energy use at a forthcoming timing in the future may be reduced rather than total energy use at the present timing.

For example, if energy is electricity, energy supplied by an energy provider may be not used when there is an alternative energy source such as a wind power plant or a photovoltaic system in a place of energy consumption. Further, surplus energy obtained from the alternative energy source may be sold to the energy provider.

In this case, information of energy use inputted from the sensor 13 is on the decrease, and the change of energy use is changed along a negative (−) slope.

FIGS. 6b and 7b are respectively corresponding to FIGS. 6a and 7a. If the change of energy use is changed along a negative (−) slope, it is described that total energy cost M3 at a forthcoming timing t3 in the future may be reduced rather than total energy use M2 at the present timing.

Figure 12:
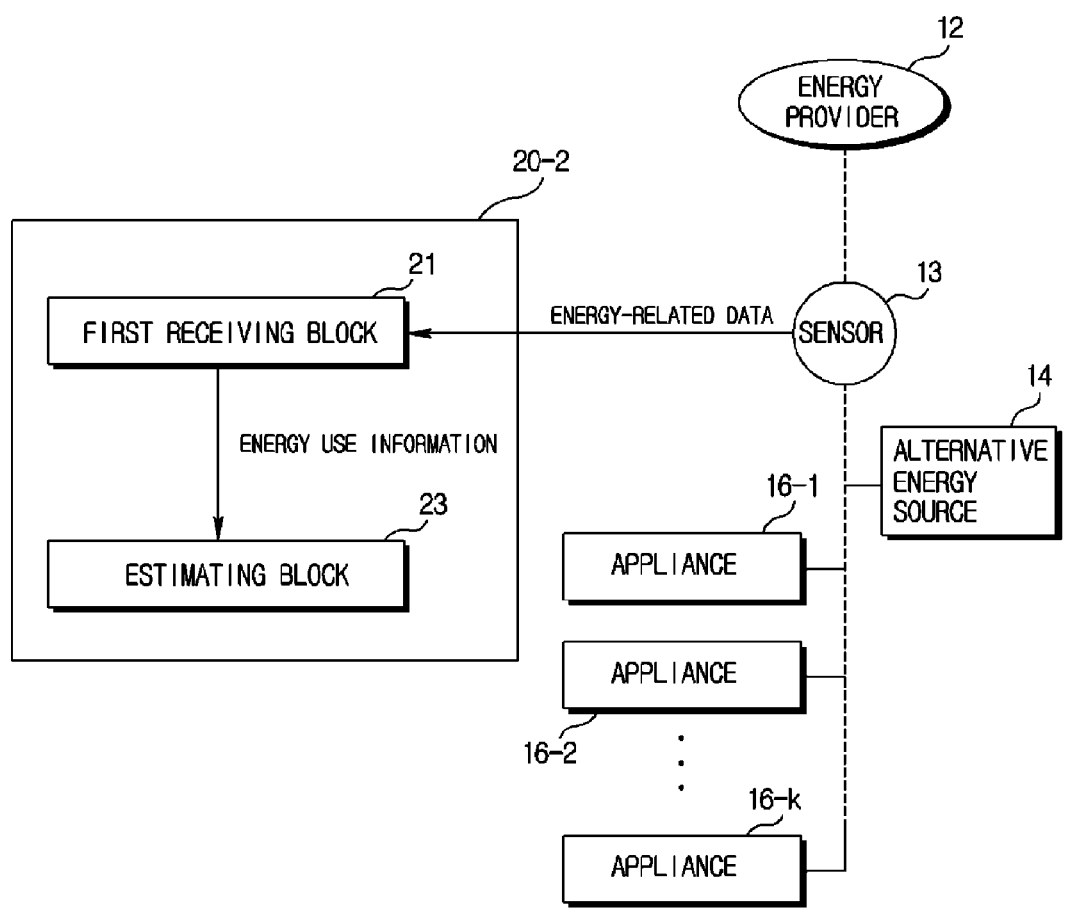
FIG. 12 shows an energy management apparatus according to a second embodiment of the present invention.

FIG. 12 shows an energy management apparatus 20-2 according to another embodiment of the present invention. The energy management apparatus 20-2 includes a first receiving block 21 and an estimating block 23.

The first receiving block 21 receives energy-related data from at least one sensor 13. As described above, the sensor 13 is a device that may detect various information related to energy use, and its specific example is a smart meter.

The energy-related data inputted to the first receiving block 21 from the sensor 13 includes various-type information as occasion demands, like information of energy consumption.

The energy use information may be provided as total energy use and to each electrical appliance using energy.

The estimating block 23 receives energy use information from the first receiving block 21 to calculate the sum of energy charges per predetermined time slot and the change of the energy use and estimates energy consumption and energy cost after a predetermined time slot based on the sum of energy charges and the change of the energy use.

Herein, the term 'after the predetermined time slot' means a time in the future when it is required to check energy use or energy charges; and the predetermined time slot may be set by a day, a week, a month, a year or fixed as a certain time in the future.

For example, the certain time is considered as user payment day or the last day of each month.

Herein, the total energy cost calculated by the estimating block 23 includes the sum of charges for energy used in each predetermined time slot.

If each time slot is an hour, the estimating block 23 calculates a sum of energy charges in each hour; otherwise, if each time slot is a day, the estimating block 23 may calculate the sum of energy charges in each day.

For example, it is assumed that total energy cost is M1 at a previous timing t1 and during one time slot after the previous timing t1, energy cost dM is increased. At the present timing t2 after one time slot from the previous timing t1, the sum of energy charges is 'M1+dM'.

Herein, the sum of energy cost from the previous timing t1 to the present timing t2 may be calculated by multiplying a sum of energy use inputted from the first receiving block 21 with an energy rate.

At this point, an energy management apparatus 20-2 may obtain information of energy rate through various methods and channels.

As one example, the information of energy rate may be received from a central server that an energy provider 12 manages over a communication network. At this point, the central server may transmit information of energy rate over various communication networks such as a wireless mesh, a power line communication network, an interne network, and so on.

As another example, the information of energy rate may be received from a user.

In this case, the energy management apparatus 20-2 may provide a UI in order for a user to input information of energy rate or may receive information of energy rate that a user inputs through another apparatus such as a PC through communication with the other apparatus.

The estimating block 23 may estimate forthcoming energy consumption or energy cost by using the sum and the change of energy use and the energy differential rate through various approaching methods.

FIGS. 2 to 5 describe methods for estimating energy consumption or cost in the future. Referring to FIGS. 2 to 5, various methods of the estimating block 23 to estimate the sum of energy charges as energy cost in the future are described.

It is assumed that total energy cost is M1 at a previous timing t1, total energy cost is M2 at the present timing t2, and the sum of energy charges is M3 at a forthcoming timing t3 when a user wants to estimate.

Herein, the change of energy cost is obtained as 'dM/dt'; in this case, 'dt' is 't2-t1' and 'dM' is 'M2-M1'.

FIG. 2b describes an example of linear method for estimating the sum of energy cost. In the linear method, the sum of energy charges M3 at the forthcoming timing t3 may be estimated as a following equation 8.

$$M3 = M2 + \frac{dM}{dt} \times (t3 - t2) \qquad \text{[Equation 8]}$$

FIG. 3b shows an example of weight method for estimating the sum of energy charges by using a weight. In the weight method, a weight C may be used variously.

For instance, the weight C is set as over 1, 1, or under 1 according to the change of energy use. In this case, the sum of energy charges M3 at the forthcoming timing t3 may be estimated as a following equation 9.

$$M3 = M2 + C \times \frac{dM}{dt} \times (t3 - t2) \qquad \text{[Equation 9]}$$

FIG. 4b shows an example of a method for estimating the sum of energy charges by using an exponential function. In this method using an exponential function, the sum of energy charges M3 at the forthcoming timing t3 may be estimated according to equation 10.

$$M3 = M2 + (e^{a(t3-t2)} - 1) \qquad \text{[Equation 10]}$$

where a value 'a' may be determined based on a cumulative use pricing or the change of energy cost.

FIG. 5b describes an example of a method for estimating the sum of energy charges by using a logarithmic function. In this method using a logarithmic function, the sum of energy charges M3 at the forthcoming timing t3 may be estimated according to equation 11.

$$M3 = M2 + \ln(a(t3-t2)+1) \qquad \text{[Equation 11]}$$

where a value 'a' may be determined based on a cumulative use pricing or the change of energy cost.

As above described, if the sum of energy charges is estimated, the estimating block 23 also estimates energy use in the future through various methods.

The forthcoming energy charges estimated in response to the sum of energy use by the estimating block 23 is a total of energy charges corresponding to an amount of energy used by a user till a predetermined time slot in the future.

In a method for estimating energy charges at a forthcoming timing, an estimated sum of energy use and a unit price of energy may be used.

Herein, a unit price of energy in the future may be same to that at the present or be changed according to a time. Further, energy rates may be fixed regardless of total energy use, or be cumulatively levied according to total energy use, i.e., amount of used energy.

Detailed method for estimating total energy use at a forthcoming timing according to an energy differential rate or schedule is described.

In a case that energy rate is fixed, if total energy cost is estimated, total energy use may be easily estimated by dividing the total energy cost by the energy rate.

For example, if total energy cost is 21,000 won and an energy rate is 100 won/Kwh, total energy use is (21,000/100) Kwh.

However, a differential rate or schedule such as a cumulative use pricing, a time of use pricing, a critical peak pricing, a real-time pricing and so on may be applied to the energy rate.

If energy rate is changeable as above described, total energy cost should be estimated by applying a differential rate or schedule.

As one of methods for estimating total energy cost, the estimating block 23 recognizes a time slot determined to reflect the change of energy charges from the present timing to a forthcoming timing in the future and the change of energy use in each time slot. For example, if the time slot is 1 hour, the change of energy charges dM is checked every hour. Then, the estimating block 23 multiplies each energy price with each change of energy charges dM in each time slot and adds up all of multiplied values to estimate total energy cost.

That is, when an energy cost is not fixed like a cumulative use pricing, a time of use pricing, a critical peak pricing, a real-time pricing and so on, the sum of energy charges M3 at the forthcoming timing may be estimated as a following equation 12.

$$Q3 = Qc + \sum_{i=1}^{n} (dM_i \div P_i) \qquad \text{[Equation 12]}$$

where 'i' is a positive integer, 'Pi' is an energy price in an $i^{th}$ time slot, and 'dMi' is the change of energy charges in an $i^{th}$ time slot.

Herein, 'Qc' is a sum of energy use at the present timing when estimation is performed; and since energy use in each previous time slot before the present timing is inputted from the first receiving block 21, the estimating block 23 easily recognizes the 'Qc'.

Further, when an energy price is changed according to a time like an example shown in FIG. 34, the energy price corresponding to each time slot may be used as 'Pi'.

However, in a case of cumulative use pricing, an energy price should be determined according to a sum of energy use and may be estimated by considering the maximum energy price in each time slot.

For example, it is assumed that total estimated energy cost at the present timing is 40,000 won. Referring to FIG. 1, the maximum energy prices at the first to fourth sections are respectively 5,510 won, 11,380 won, 16,830 won, and 24,860 won.

Adding up 5,510 won, 11,380 won and 16,830 won is 33,720 won. Subtracting 33,720 won from 40,000 won is 6,280 won. Accordingly, energy cost of 6,280 won is occurred in the fourth section. In the fourth section, energy use is 25.26 Kwh (6280/248.6) since a unit price is 248.6 won. That is, total energy use corresponding to total estimated energy cost of 40,000 won may be estimated as 325.26 Kwh.

This method for estimating energy use in a cumulative use pricing may be also applied to that in an energy cost of each time slot.

Each time slot may be divided every 1 minute, 5 minutes, 10 minutes, 15 minutes, 30 minutes and so on.

The estimating block 23 may store a load profile including sums of energy use or energy charges in each previous time slot as well as each forthcoming time slot in the future.

This information is provided to user's mobile terminal or an In Home Display (IHD) device via a transmitting block described hereinafter so that energy consumption or energy cost in the past or future is informed to a user.

As another method for estimating total energy cost based on total estimated energy use, the estimating block 23 uses a bipartite correspondence between the total energy cost and the total energy use.

Figure 13:
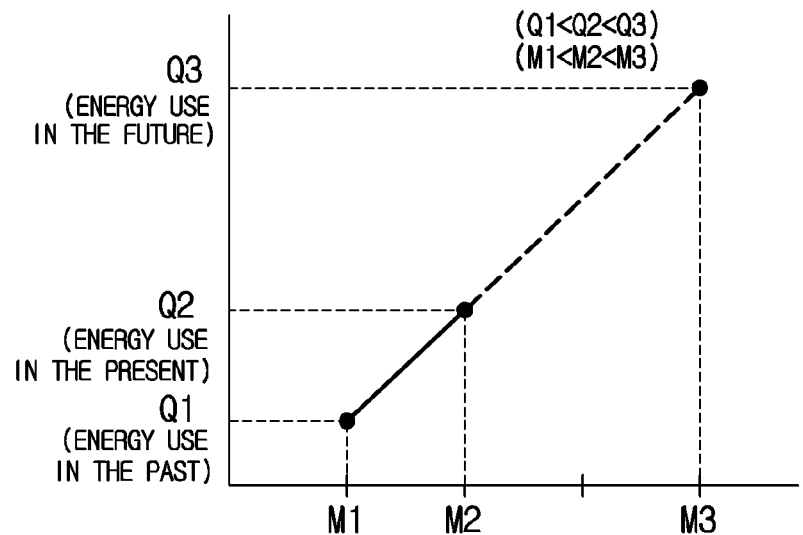
FIGS. 13 and 14 show a method for estimating energy consumption from energy cost in the future.
Figure 13:
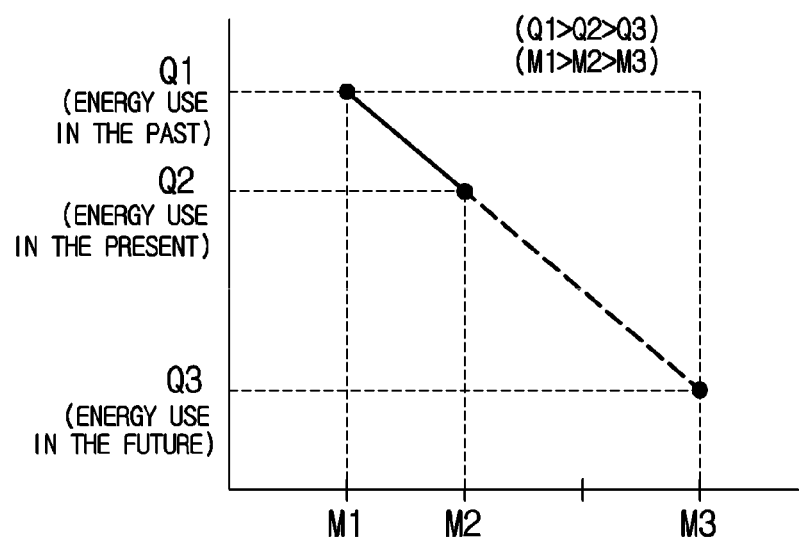
Figure 14:
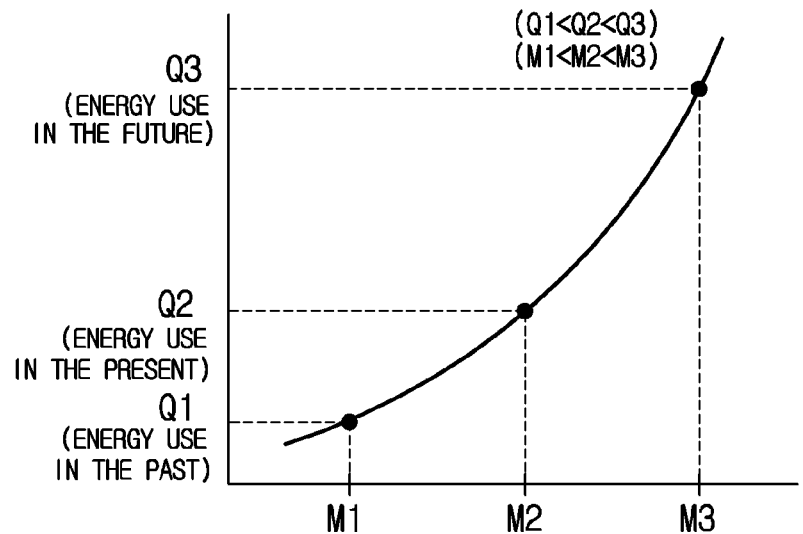
Figure 14:
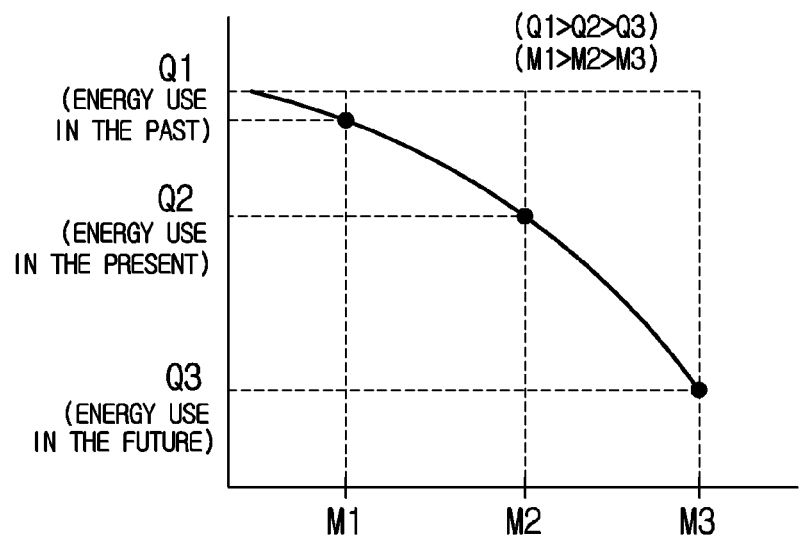

FIGS. 13 and 14 show a method for estimating energy consumption from energy cost in the future. Referring to FIGS. 13 and 14, that method is described.

It is assumed that total energy use is Q1 when total energy cost is M1 at a previous timing t1; and total energy use is Q2 when total energy cost is M2 at the present timing t2. Then, the change of energy cost dM is 'M2-M1', and the charge of energy use dQ is 'Q2-Q1'.

FIG. 13a describes an example of liner method for estimating total energy use in the future. If the sum of energy cost is M3 at a forthcoming timing t3 when a user wants to estimate in the future, total energy use Q3 at the forthcoming timing t3 may be estimated as a following equation 6.

$$Q3 = Q2 + \frac{dQ}{dM} \times (M3 - M2) \qquad \text{[Equation 13]}$$

FIG. 14a shows an example of method for estimating total energy cost by using an exponential function. Particularly, this method using an exponential function is properly applied to a case of cumulative use pricing. If the sum of energy cost is M3 at a forthcoming timing t3, total energy use Q3 at the forthcoming timing t3 may be estimated as a following equation 14.

$$Q3 = Q2 + (e^{a(M3-M2)} - 1) \qquad \text{[Equation 14]}$$

where a value 'a' may be determined based on a cumulative rate or a 'dQ/dM'.

In relation to the methods of FIGS. 13 and 14, the corresponding relation information between the sum of energy use and the sum of energy charges may be maintained by the estimating block 23, or may be inputted from the central server or user, depending on the case.

Moreover, the corresponding relation information between the sum of energy use and the sum of energy charges may be expressed as shown in the above Equations or may refer to a Look-Up Table.

FIGS. 8b, 9b, 10b, and 11b are respectively corresponding to FIGS. 2b, 3b, 4b, and 5b. If there is an alternative energy source 14 in the place of energy consumption, it is described that total energy cost at a forthcoming timing in the future may be reduced rather than total energy cost at the present timing.

For example, if energy is electricity, energy supplied by an energy provider may be not used when there is an alternative energy source such as a wind power plant or a photovoltaic system in a place of energy consumption. Further, surplus energy obtained from the alternative energy source may be sold to the energy provider.

In this case, information of energy use inputted from the sensor 13 is on the decrease, and the change of energy cost is changed along a negative (−) slope.

FIGS. 13b and 14b are respectively corresponding to FIGS. 13a and 14a. When the alternative energy source 14 is used in a place of energy consumption, it is described that total energy cost M3 at a forthcoming timing t3 in the future may be reduced rather than total energy use M2 at the present timing.

In the energy management apparatuses 20-1 and 20-2 according to the above described embodiments of the present invention, the estimating block 23 may estimate total energy use or total energy cost of all appliances in the future as well as those of each appliance when information of energy use in each appliance is inputted from the sensor 13.

Furthermore, the estimating block 23 may estimate various-type information related to energy use or energy cost in the future.

For instance, the estimating block 23 may estimate the energy cost for billing purposes as an estimated energy cost by using information of predetermined energy rate or schedule suggested by an energy provider 12.

If energy is electricity, the information of energy rate or schedule suggested by the energy provider 12 includes a basic charge, a tax, a deduction charge, a benefit and so on. Herein, the tax includes a value added tax (VAT), various tax items and etc.; and the benefit includes some favor to a specific field business. For example, there is some favor at an electric fee in knowledge based industry rather than other industry.

In a case that an energy rate inputted from a user or a central server is based on a cumulative use pricing shown in a following Table 2, it is described to estimate an energy cost for billing purposes as an estimated energy cost.

TABLE 2

|  | First section | Second section | Third section | Fourth section | ... |
|---|---|---|---|---|---|
| Range [kwh] | ~100 | 101~200 | 201~300 | 301~400 | ... |
| Unit price (won/Kwh) | 55.10 | 113.80 | 168.30 | 248.60 | ... |
| Basic charge | 370 | 820 | 1,430 | 3,420 | ... |

The energy cost for billing purposes to a user is a sum of electric fee and add-on fees: the electric fee is calculated as ('total energy use'×'unit price'+basic charge); and the add-on fees may be determined by a sum of a value added fee and a fee for power industry based fund. For example, the fee for power industry based fund is 3.7% of the electric fee, and the value added fee is 10% of the electric fee.

It is assumed that: the present date is Apr. 21, 2010; payment day is the last day of each month; total energy use during April 1 to April 20 is 230 Kwh; and an energy use till a date April 19 is 218 Kwh.

If a time slot is a day (24 hours), the change of user use 'dQ/dt' is 12 Kwh because 'dQ' is 12 Kwh (230-218) and 'dt' is 1.

According to the linear method described in FIG. 2a, there are 10 days (April 21 to April 30) to the last day of April; then, estimated total energy use on a date April 30 is 350 Kwh, which is obtained by (230+12×10).

Since the estimated total energy use is 350 Kwh, referring to table 2, an electric fee is calculated as (100×55.1+100×113.8+100×168.3+50×248.6+3,420) won. Herein, the last item '3,420 won' is a basic charge.

That is, the electric fee is 49,570 won, and add-on fees are 6,791.09 won (49,570×0.037+49,570×0.1). Thus, the energy cost for billing purposes is 56,361.09 won.

As above described, by adding a basic charge and add-on fees, the estimating block 23 may estimate the energy cost for billing purposes. Further, according to a place of energy consumption such as a home, a company, or other situations, an energy rate or schedule applied for calculating energy cost for billing purposes may be set or determined differently.

Figure 15:
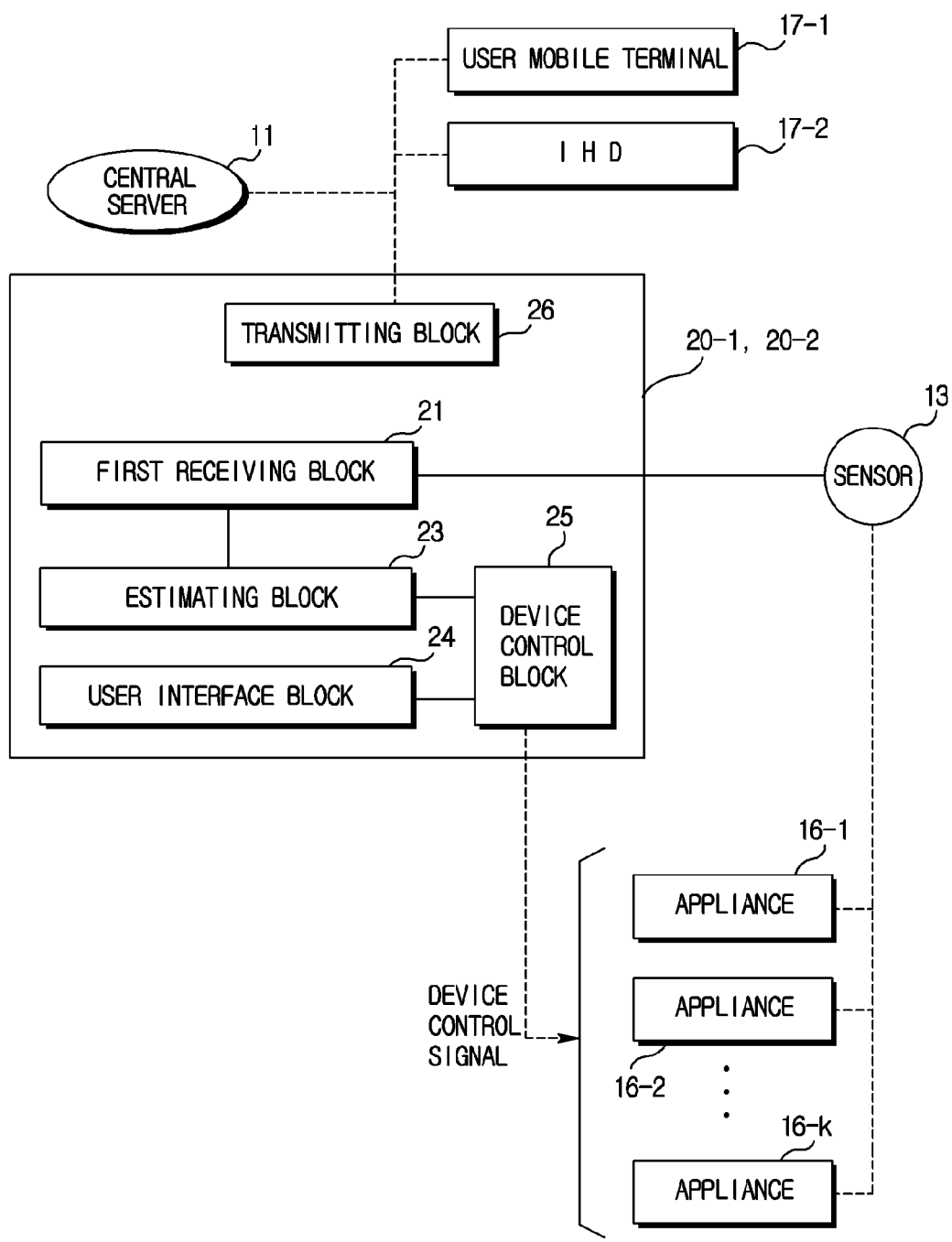
FIG. 15 shows an energy management apparatus according to a modification of the first and second embodiments of the present invention.

FIG. 15 shows an energy management apparatus according to another embodiment of the present invention. Referring to FIG. 15, the energy management apparatus 20-1 or 20-2 according to embodiments of the present invention may further include at least one of a user interface block 24, a device control block 25, a transmitting block 26, and combinations thereof.

The user interface block 24 is configured to receive various information and command, inputted to the energy management apparatuses 20-1 and 20-2, from a user through a key pad, a touch screen, and so on.

Especially, the user interface block may set various information related to operations of the energy management apparatuses 20-1 and 20-2 such as a user's mobile terminal number for receiving various information, an upper limit value about energy use or energy charge to determine a situation of excessive energy use, and a load control schedule for controlling an electrical appliance.

The user interface block 24 may include a display module for providing a visual interface screen to a user.

The device control block 25 controls at least one of appliances according to energy use or energy cost in the future, which is estimated by the estimating block 23.

Herein, plural appliances 16-1 to 16-k includes various-type appliances consuming energy in a place of energy consumption.

The device control block 25 may control the plural appliances 16-1 to 16-k; particularly, supply or block energy to the plural appliances 16-1 to 16-k.

The transmitting block 26 transmits information related to energy use to other various devices or apparatuses such as user's mobile terminal 17-1, an In Home Display (IHD) device 17-2, and so on.

The various interfaces to other devices may include an interface for wire/wireless near field communications, an interface through an internet network, and an interface through a mobile communication network.

Figure 16:
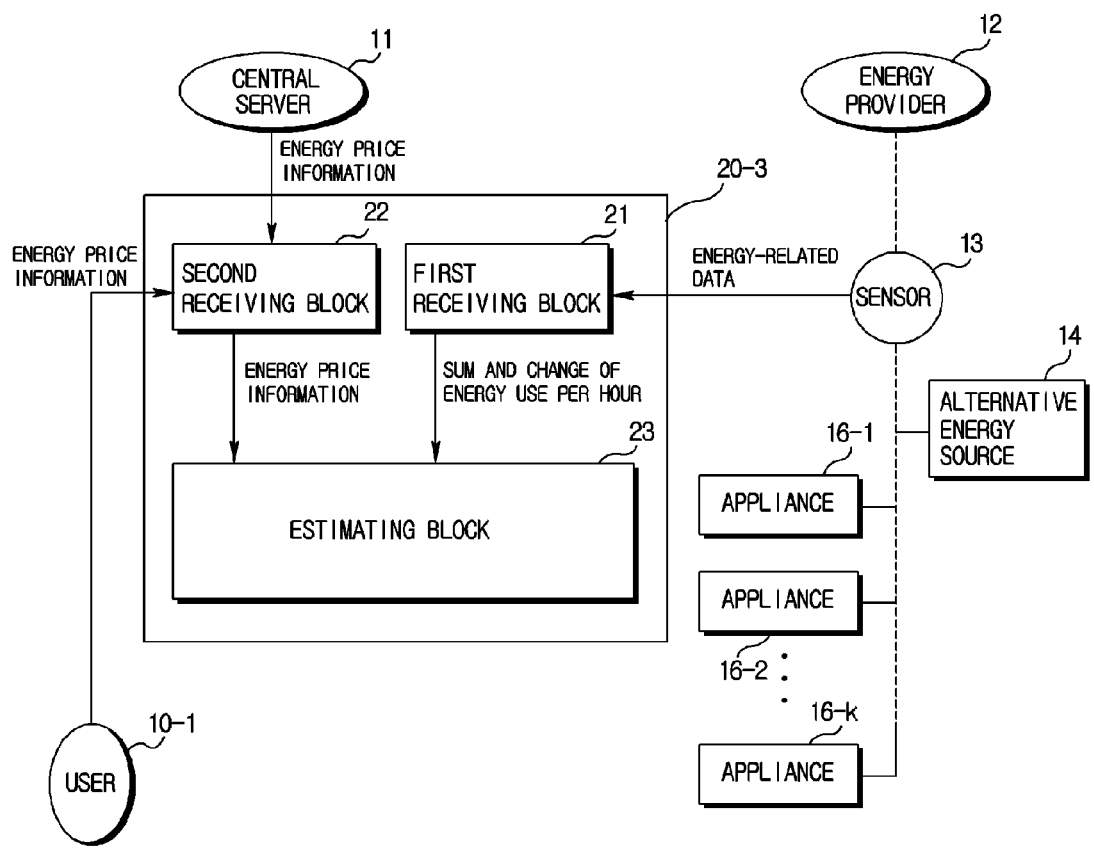
FIG. 16 shows an energy management apparatus according to a third embodiment of the present invention.

FIG. 16 shows an energy management apparatus 20-3 according to a third embodiment of the present invention. The energy management apparatus 20-3 includes a first receiving block 21, a second receiving block 22, and an estimating block 23.

The first receiving block 21 receives energy-related data from at least one sensor 13.

The sensor 13 senses various information related to energy use and may be an electronic meter for measuring states when energy supplied from an energy provider 12 is consumed by electrical appliances 16-1 to 16-k in each energy-supplied place.

The specific example of the sensor 13 is a smart meter, and various kinds of alternative energy sources 14 may be provided in the energy-supplied place.

The energy-related data that the first receiving block 21 receives from the sensor 13 may be variously configured depending on the case and its example is energy use information. The energy use information may be provided for each electrical appliance using energy or may be provided as a total energy use.

Additionally, when the sensor 13 provides information related to energy price, the energy use information may be included in the provided information.

The first receiving block 21 checks information regarding a sum and change of energy use per predetermined time slot using the energy-related data received from the sensor 13 and delivers the information to the estimating block 23.

The sum of energy use per time that the first receiving block 21 delivers to the estimating block 23 is the sum of energy use at a predetermined time slot.

That is, if the predetermined time slot is an hour unit, the sum of energy use per hour is acquired, and if the predetermined time slot is a day unit, the sum of energy use per day is acquired.

For example, if the total of energy use is Q1 at a previous timing t1 and energy is further consumed by dQ as a corresponding time unit elapses from the previous timing t1, the sum of energy use at a present timing t2 after the corresponding time unit elapses from the previous timing t1 is 'Q1+dQ' and the change of energy use is dQ.

The second receiving block 22 receives information of energy rate per time unit from the central server 11 connected over a communication network.

The central server 11 is a server with which an energy provider or a certain provider qualified for providing information of energy rate to each user provides information of energy rate per time unit via a communication network. The central server 11 may transmit the information of energy rate over various communication networks such as a wireless mesh, a power line communication network, and an internet network.

Additionally, the second receiving block 22 receives information of energy rate per time unit from a user 10-1. In this case, the second receiving block 22 may provide a UI in order for the user 10-1 to input information of energy rate per time unit or may receive information of energy rate that the user 10-1 inputs through another apparatus such as a PC through communication with the other apparatus.

The estimating block 23 receives information regarding a sum and a change of energy use per predetermined time slot from the first receiving block 21 and also receives information of energy rate per time unit to estimate energy use and energy charges after a predetermined time slot.

Herein, the term "after the predetermined time slot' means a time in the future when it is required to check energy use or energy charges and the predetermined time slot may be set by a day, a week, a month, a year, or a certain time in the future.

The certain time in the future may be a payment day set by a user, for example, the last day of each month.

The methods, where the estimating block 23 estimates future energy use or energy charges on the basis of information regarding the sum and the change of energy use per predetermined time slot, may be variously provided.

At this point, the estimating block 23 may estimate future energy use in the same method as the energy management apparatus 20-1 according to the first embodiment as described with reference to FIGS. 2a to 5a.

When the future energy use is estimated, the estimating block 23 may estimate future energy charges in various methods. The energy charges that the estimating block 23 estimates through the sum of energy use corresponds to the sum of energy use, that is, the sum of energy charges about energy that a user consumes until a corresponding time in the future.

One method, which estimates the sum of energy charges for a time in the future, uses the estimated sum of energy use and energy unit price.

The future energy price may be the same as today or may be changed over time. Additionally, energy price may not be changed according to energy use and may be accumulatively changed according to changes of energy use.

A detailed method, which estimates the sum of future energy charges according to a structure of energy price information received by the second receiving block 22 from the user 10-1 or the central server 11, will be described below.

If energy rates are fixed, information of energy rate may include simple unit prices such as won/KWh, won/KVarh, won/KVAh, and etc.

However, a differential rate or schedule such as a cumulative use pricing, a time of use pricing, a critical peak pricing, a real-time pricing and so on may be applied to the energy rate.

In a case energy rate is fixed, if the sum of future energy use is estimated, total energy cost may be easily estimated by multiplying the sum of energy use with the energy rate.

For example, if a sum of energy use is 210 Kwh and an energy rate is 100 won/Kwh, total energy cost is (210×100) won.

However, if energy rate is changeable based on time or energy use like a cumulative use pricing, a time of use pricing, a critical peak pricing, a real-time pricing and so on, total energy cost should be estimated by applying a differential rate or schedule.

As one of methods for estimating the total energy cost, the estimating block 23 check each change of energy use dQ by a time slot (for example, one hour unit) which reflects changes of energy prices in a period from a present timing to a fourth coming timing in the future. Then, the estimating block 23 multiplies each change of energy use dQ with corresponding energy price in a corresponding time slot, and then adds up all multiplication results to estimate total energy cost. That is, if energy price is changeable, the sum M3 of future total energy charges may be estimated as the above equation 5.

At this point, the estimating block 23 may store and maintain previous energy use for each time slot or energy charge as a load profile and also estimated future energy use for each time slot or energy charge as a load profile.

This information may be transmitted to a mobile terminal or an IHD through a transmission means described below so that previous or forthcoming energy use for each time slot or energy charge can be notified to a user.

As another method which estimates the sum of energy charges from the sum of estimated energy use, the estimating block 23 uses corresponding relation information between the sum of energy use and the sum of energy charges as described with reference to FIGS. 6a and 7a.

The corresponding relation information between the sum of energy use and the sum of energy charges in FIGS. 6a and 7a may be maintained by the estimating block 23 and inputted from the central server 11 or the user 10-1, depending on the case.

FIGS. 8a, 9a, 10a, and 11a correspond to FIGS. 2a, 3a, 4a, and 5a, respectively. If there is an alternative energy resource 14 in an energy consuming place, the sum of future energy use may be reduced compared to the sum of present energy use.

For example, if energy is electricity, energy supplied by an energy provider may not be used when there is an alternative energy source such as a wind power plant or a photovoltaic system in a place of energy consumption. Further, surplus energy obtained from the alternative energy source may be sold to the energy provider.

In this case, energy use information inputted from the sensor 13 is changed in order for energy use to decrease, and the change of energy use is made along a negative (−) slope.

FIGS. 6b and 7b are respectively corresponding to FIGS. 6a and 7a. If the change of energy use is changed along a negative (−) slope, it is shown that the sum M3 of estimated energy charges at a forthcoming timing t3 in the future may be reduced than the sum M2 of present energy charges at a present timing.

Figure 17:
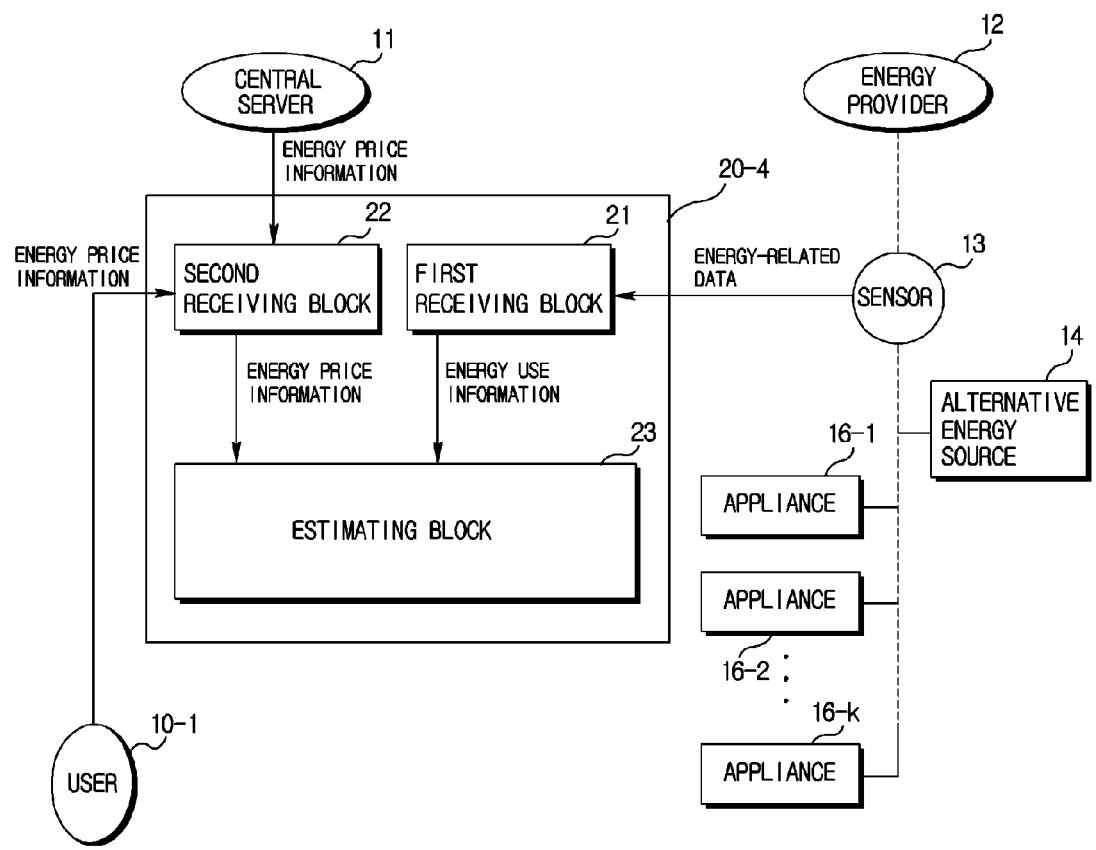
FIG. 17 shows an energy management system according to a fourth embodiment of the present invention.

FIG. 17 shows an energy management apparatus 20-4 according to a forth embodiment of the present invention. The energy management apparatus 20-4 includes a first receiving block 21, a second receiving block 22, and an estimating block 23.

The first receiving block 21 receives energy-related data from at least one sensor 13.

The sensor 13 senses various information related to energy use and may be an electronic meter for measuring states when energy supplied from an energy provider 12 is consumed by electrical appliances 16-1 to 16-k in each energy-supplied place.

The sensor 13 senses various information related to energy use and may be an electronic meter for measuring states when energy supplied from an energy provider 12 is consumed by electrical appliances 16-1 to 16-k in each energy-supplied place.

As a specific example of the sensor 13, there is a smart meter, and various kinds of alternative energy sources 14 may be provided in the energy-supplied place.

The energy-related data that the first receiving block 21 receives from the sensor 13 may include diverse information depending on the case and its example is energy use information.

The energy use information may be provided to each electrical appliance using energy or may be provided as a total energy use. Additionally, when the sensor 13 provides information related to energy price, the energy use information may be included in the provided information.

The second receiving block 22 receives information of energy rate per time unit from the central server 11 connected over a communication network.

Moreover, the second receiving block 22 receives information of energy rate per time unit from a user 10-1. In this case, the second receiving block 22 may provide a UI in order for the user 10-1 to input information of energy rate per time unit or may receive information of energy rate that the user 10-1 inputs through other apparatuses such as a PC through communication with a corresponding apparatus.

The estimating block 23 receives information regarding the sum of energy use per predetermined time slot and changes of energy uses from the first receiving block 21 and also receives information of energy rate per time unit from the second receiving block to calculate the sum and the change of energy use for predetermined time slot and then to estimate energy use and energy charges after a predetermined time slot based on the calculation.

Herein, the term "after the predetermined time slot' means a time in the future when it is required to check energy use or energy charges and the predetermined time slot may be set by a day, a week, a month, a year, or a certain time in the future.

The certain time in the future may be a payment day set by a user, for example, the last day of each month.

Herein, the total energy cost calculated by the estimating block 23 includes the sum of charges for energy used in each predetermined time slot.

That is, if each time slot is an hour, the estimating block 23 calculates a sum of energy charges in each hour; otherwise, if each time slot is a day, the estimating block 23 may calculate the sum of energy use in each day.

For example, it is assumed that total energy cost is M1 at a previous timing t1 and during one time slot after the previous timing t1, energy cost dM is increased. At the present timing t2 after one time slot from the previous timing t1, the sum of energy charges is 'M1+dM'.

Herein, the sum of energy charges from the previous timing t1 to the present timing t2 may be calculated by multiplying energy use inputted from the first receiving block 21 with an energy rate inputted from the second receiving block 22.

The methods, where the estimating block 23 estimates future energy use or energy charges on the basis of information regarding the sum and change of energy charges per predetermined time slot, may be variously provided.

At this point, the estimating block 23 may estimate future energy charges in the same method as that of the energy management apparatus 20-2 according to the second embodiment as described with reference to FIGS. 2b to 5b.

If the sum of energy charges is estimated, the estimating block 23 also estimates the future energy use in various methods.

The energy use that the estimating block 23 estimates through the sum of energy charges corresponds to the sum of energy charges, i.e., is the sum of energy use that a user consumes until a corresponding time in the future.

One method of estimating the sum of future energy use uses the estimated sum of energy charges and energy unit price.

Herein, a unit price of energy in the future may be the same as that at the present or be changed according to a time. Further, energy rates may be fixed regardless of total energy use, or be accumulatively changed according to total energy use, i.e., amount of used energy.

A detailed method that estimates total energy use at a forthcoming timing according to an energy differential rate or schedule will be described below.

In a case that energy rate is fixed, if total energy cost is estimated, total energy use may be easily estimated by dividing the total energy cost by the energy rate.

For example, if total energy cost is 21,000 won and an energy rate is 100 won/Kwh, total energy use is (21,000/100) Kwh.

However, a differential rate or schedule such as a cumulative use pricing, a time of use pricing, a critical peak pricing, a real-time pricing and so on may be applied to the energy rate.

If energy rate is changeable as above described, total energy cost is required to be estimated by applying a differential rate or schedule.

As one of methods for estimating total energy use, the estimating block 23 recognizes a time slot determined to reflect the change of energy charges from the present timing to a forthcoming timing in the future and the change of energy use in each time slot. For example, if the time slot is 1 hour, the change of energy charges dM is checked every hour. Then, the estimating block 23 divides each change of energy charges dM by each energy price in a corresponding time slot and adds up all of divided values to estimate total energy use.

That is, when an energy cost is not fixed like a cumulative use pricing, a time of use pricing, a critical peak pricing, a real-time pricing and so on, the sum of energy use Q3 at the forthcoming timing may be estimated as the above equation 12.

However, in a case of cumulative use pricing, an energy price should be determined according to a sum of energy use and may be estimated by considering the maximum energy price in each time slot.

For example, it is assumed that total estimated energy cost at the present timing is 40,000 won. Referring to table 1, the maximum energy prices at the first to fourth sections are respectively 5,510 won, 11,380 won, 16,830 won, and 24,860 won.

Adding up 5,510 won, 11,380 won and 16,830 won is 33,720 won. Subtracting 33,720 won from 40,000 won is 6,280 won. Accordingly, energy cost of 6,280 won is occurred in the fourth section. In the fourth section, energy use is 25.26 Kwh (6280/248.6) since a unit price is 248.6 won. That is, total energy use corresponding to total estimated energy cost of 40,000 won may be estimated as 325.26 Kwh.

This method for estimating energy use in a cumulative use pricing may be also applied to that in an energy cost of each time slot.

The estimating block 23 may store a load profile including sums of energy use or energy charges in each previous time slot as well as each forthcoming time slot in the future.

This information is provided to user's mobile terminal or an In Home Display (IHD) device via a transmitting block described hereinafter so that energy consumption or energy cost in the past or future is informed to a user.

As another method for estimating total energy cost based on total estimated energy use, the estimating block 23 uses a bipartite correspondence between the total energy cost and the total energy use as described with reference to FIGS. 13 and 14.

In relation to the methods of FIGS. 13 and 14, the estimating block 23 may maintain the corresponding relation information between the sum of energy use and the sum of energy charges or may receive the information from the central server 11 or user 10-1, depending on the case.

FIGS. 8*b*, 9*b*, 10*b*, and 11*b* correspond to FIGS. 2*b*, 3*b*, 4*b*, and 5*b*, respectively. If there is an alternative energy resource 14 in an energy consuming place, the sum of future energy charges may be reduced compared to the sum of present energy charges.

For example, if energy is electricity, energy supplied by an energy provider may be not used when there is an alternative energy source such as a wind power plant or a photovoltaic system in a place of energy consumption. Further, surplus energy obtained from the alternative energy source may be sold to the energy provider.

In this case, energy use information inputted from the sensor 13 is changed in order for energy use to decrease, and thus the change of energy charges is made along a negative (−) slope.

FIGS. 13*b* and 14*b* are respectively corresponding to FIGS. 13*a* and 14*a*. When the alternative energy source is used in a place of energy consumption, it is shown that future total energy use may be further reduced because changes of energy cost are reduced.

In the energy management apparatuses 20-3 and 20-4 according to the third and fourth embodiments of the present invention, the estimating block 23 may estimate total energy use or total energy cost of all appliances in the future as well as those of each appliance when information of energy use in each appliance is inputted from the sensor 13.

Furthermore, the estimating block 23 may estimate various-type information related to energy use or energy cost in the future.

For instance, as mentioned above, the estimating block 23 may estimate the energy cost for billing purposes as an estimated energy cost by using information of predetermined energy rate or schedule suggested by an energy provider 12.

If energy is electricity, the information of energy rate or schedule suggested by the energy provider 12 includes a basic charge, a tax, a deduction charge, a benefit and so on. Herein, the tax includes a value added tax (VAT), various tax items and etc.; and the benefit includes some favor to a specific field business. For example, there is some favor at an electric fee in knowledge based industry rather than other industry.

Figure 18:
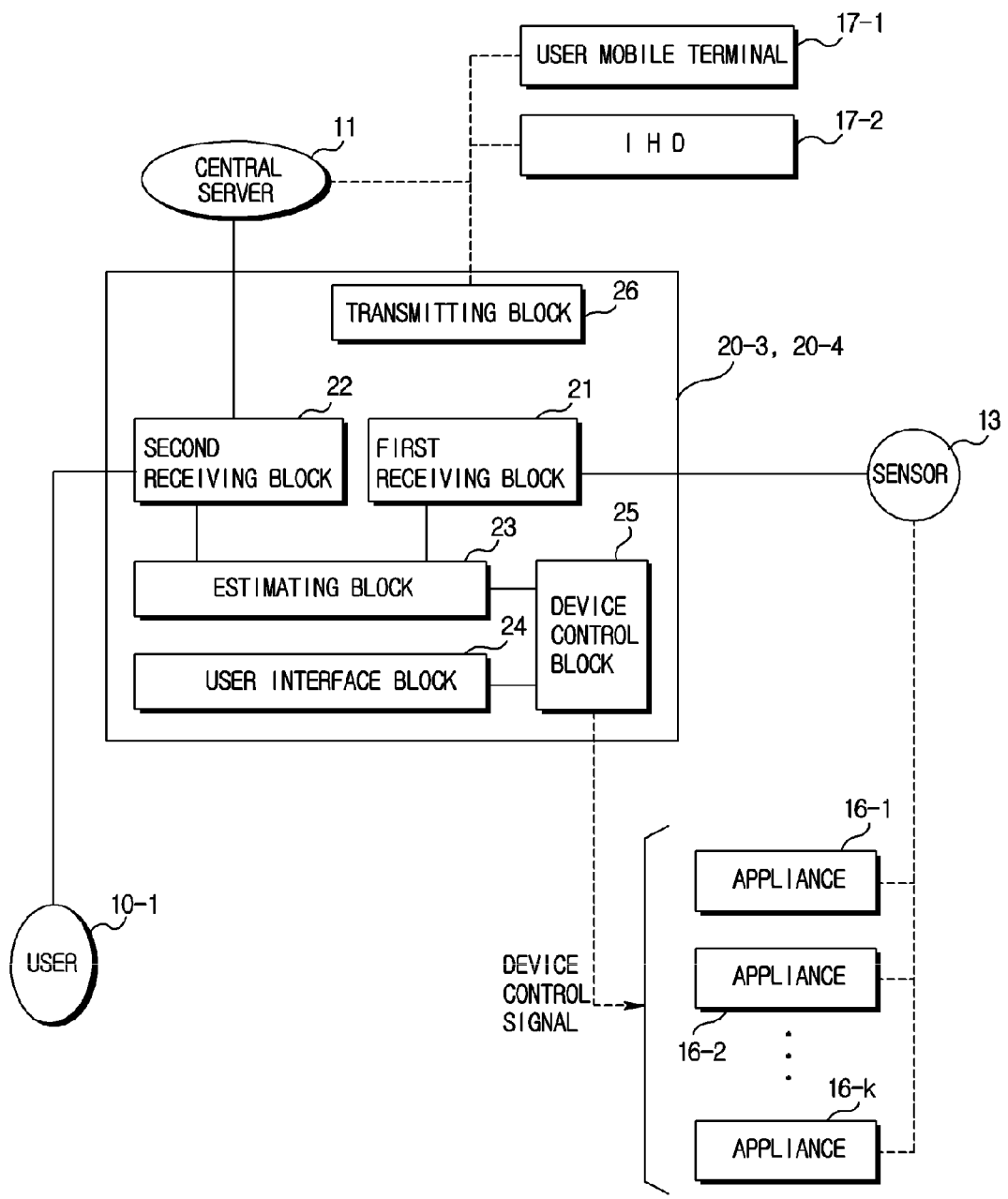
FIG. 18 shows an energy management apparatus according to a modification of the third and fourth embodiments of the present invention.

FIG. 18 shows the energy management apparatuses 20-3 and 20-4 according to the third and fourth embodiments of the present invention. The energy management apparatuses 20-3 or 20-4 according to embodiments of the present invention further include at least one of a user interface block 24, a device control block 25, a transmitting block 26, and combinations thereof.

The user interface block 24 allows the user 10-1 to input various information and commands to the energy management apparatuses 20-3 and 204 with a key pad, a touch screen, and or like.

The user interface block 24 may include a display module for providing a visual interface screen to the user 10-1.

In particular, the user interface block 24 may set various information related to operations of the energy management apparatuses 20-3 and 20-4 such as a user's mobile terminal number for receiving various information, an upper limit value about energy use or energy charge to determine a situation of excessive energy use, and a load control schedule for controlling an electrical appliance.

Moreover, when the second receiving block 22 is configured to receive energy cost information based on time from the user 10-1, the user interface block 24 may be configured in order for a user to input energy price information based on time.

The device control block 25 controls at least one of appliances according to energy use or energy cost in the future, which is estimated by the estimating block 23.

Herein, electrical appliances 16-1 to 16-*k* are various-type appliances consuming energy in a place of energy consumption.

The device control block 25 may control the electronic appliances 16-1 to 16-*k* in various methods depending on the case, particularly, supply or block energy to the electrical appliances 16-1 to 16-*k*.

The transmitting block 26 may transmit energy use information to other devices such as a portable terminal 17-1, an IHD 17-2, or a central server 11. The transmitting block 26 may transmit information through various methods such as an interface for wire/wireless near field communications, an interface through an interne network, and an interface through a mobile communication network.

Figure 19:
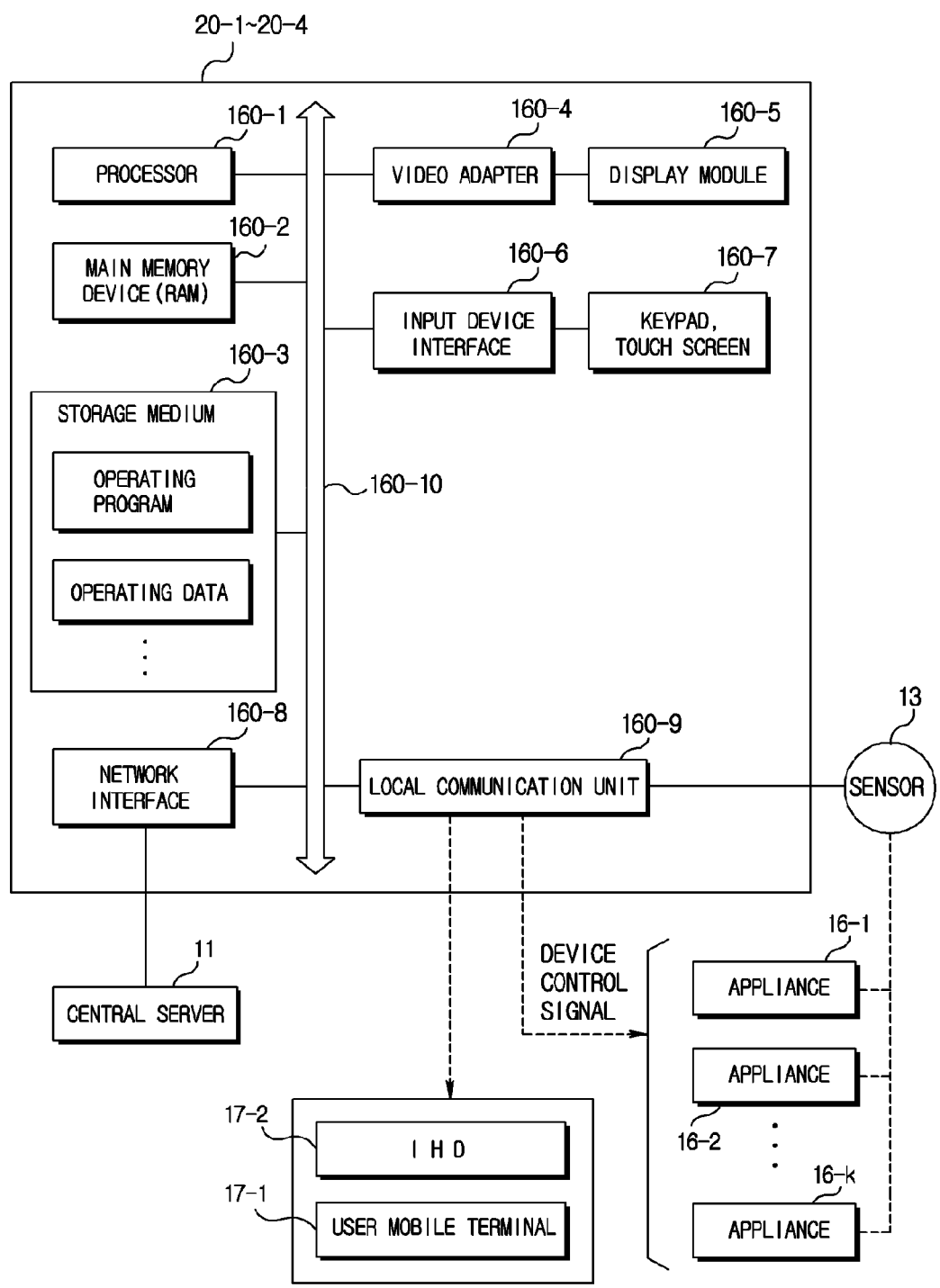
FIG. 19 shows a configuration of an energy management apparatus according to an embodiment of the present invention.

FIG. 19 shows the energy management apparatuses 20-1 to 20-4 according to the first to fourth embodiments of the present invention.

A processor 160-1 including a central processing unit (CPU) or a microprocessor generally controls operation of the energy management apparatus 20-1 or 20-2 by communicating information with other blocks via a system bus 160-10 having various structures.

A random access memory (RAM) 160-2 as a main storage device temporary stores a computer program or data directly accessed by the processor 160-2.

A video adapter 160-4 visually outputs an operating status of the energy management apparatus or information provided to a user through a display module 160-5. The display module 160-5 may include one or more of a liquid crystal display (LCD), a light emitting diode (LED), and so on.

An input device interface 160-6 is configured to receive various information and command, inputted to the energy management apparatus 20-1 and 20-2, from a user 10-1 through various input devices 160-7 like a key pad, a touch screen, and so on.

A network interface 160-8 enables the energy management apparatus 20-1 or 20-2 to communicate with a central server 11 via a communication network.

A local communicating unit 160-9 allows the energy management apparatus 20-1 or 20-2 to communicate with other various devices such as a sensor 13, appliances 16-1 to 16-*k*, user's mobile terminal 17-1, IHD 17-2, and so on.

Herein, if it is required to communicate the energy management apparatus 20-1 or 20-2 with at least two other devices, at least two local communicating units are included.

Further, the local communicating unit 160-9 may provide communication with other devices located in a local area around a place of energy consumption through a wire serial communication, a local wireless communication, a power line communication, and etc. as well as interface with a wide area network such as a mobile communication.

A storage device 160-3 may store operating programs, and a variety of data to operate the energy management apparatus.

A storage device 160-3 may include a read only memory (ROM); but preferably, include a nonvolatile memory device which is readable and writable because data or information may be often stored or deleted and should be maintained regardless condition of power supply. The storage device 160-3 may have various structures such as an internal-type, an external-type, a separate-type, a united-type and other-type one.

An operating program stored in the storage device 160-3 is a kind of computer program for performing functions of the energy management apparatus 20-1 or 20-2.

There are diverse kinds of operating programs including at least a program module for performing operations of the first receiving block 21 and a program module for performing operations of the estimating block 23, in relation to the energy management apparatuses 20-1 and 20-2 according to the first and second embodiments.

Additionally, the operating program at least includes a program module for performing operations of the first receiving block 21, a program module for performing operations of the second receiving block 22, and a program module for performing operations of the estimating block 23, in relation to the energy management apparatuses 20-3 and 20-4 according to the third and fourth embodiments.

Further, as another embodiment, the operating program may include another program module to control the user interface block 24 to allow the energy management apparatuses 20-1 to 20-4 according to the first to fourth embodiments to interface with a user, another program module to control the device control block 25, and another program module to control the transmitting block 26.

If the energy management apparatus 20-1 or 20-2 start to operate, the processor 160-1 delivers an operating program stored in the storage block 160-3 to the main storage device 160-2 and performs the operating program to control each block included in the energy management apparatus 20-1 or 20-2 according to above described or following described embodiments of the present invention.

FIG. 19 shows an exemplary embodiment of the present invention. The energy management apparatus 20-1 or 20-2 may be constructed differently according to an embodiment.

Figure 20:
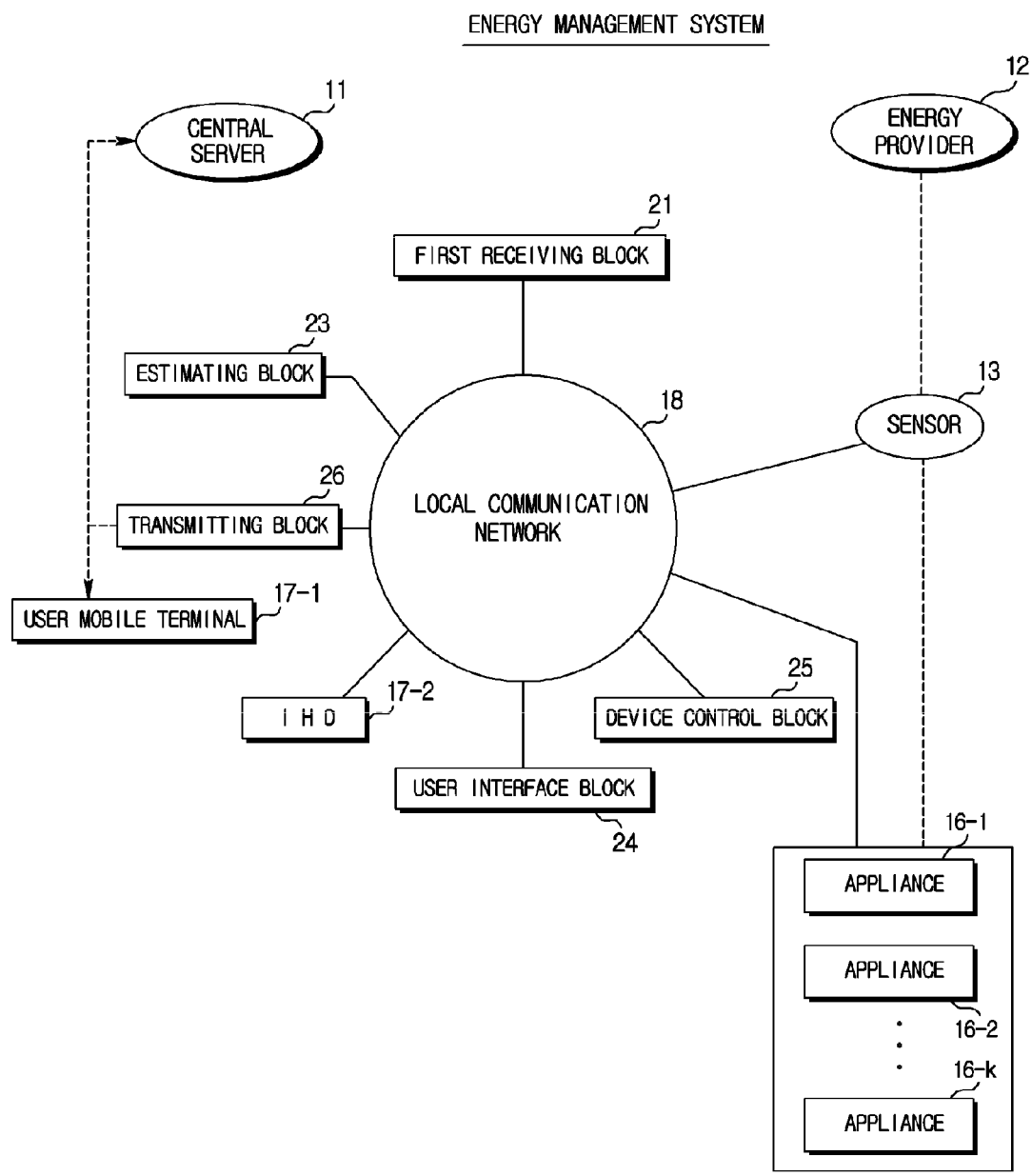
FIG. 20 shows a configuration of an energy management system according to first and second embodiments.

FIG. 20 shows an energy management system according to first and second embodiments of the present invention. The energy management system at least includes a first receiving block 21 and an estimating block 23.

The energy management system may further includes one or more of a user interface block 24, a device control block 25, a transmitting block 26, and combination thereof.

In the energy management system, the first receiving block 21, the estimating block 23, the user interface block 24, the device control block 25, and the transmitting block 26 are independently formed and respectively communicated with each other through a local communication network 18 such as a home network system.

Meanwhile, at least one of the first receiving block 21, the estimating block 23, the user interface block 24, the device control block 25, and the transmitting block 26 may be formed as a single device.

In an example of the former, a personal computer (PC) or a digital TV system may be used as the user interface block 24. As the device control block 25, main controller included in a home network system (not shown) controlling or managing each of appliances 16-1 to 16-$k$ may be used The first receiving block 21 and estimating block 23 of the energy management system perform the same operations as those of the energy management apparatus 20-1 according to the first embodiment or those of the energy management apparatus 20-2 according to the second embodiment, so that future energy use or energy charges may be estimated. Thus, overlapping description will be omitted.

Figure 21:
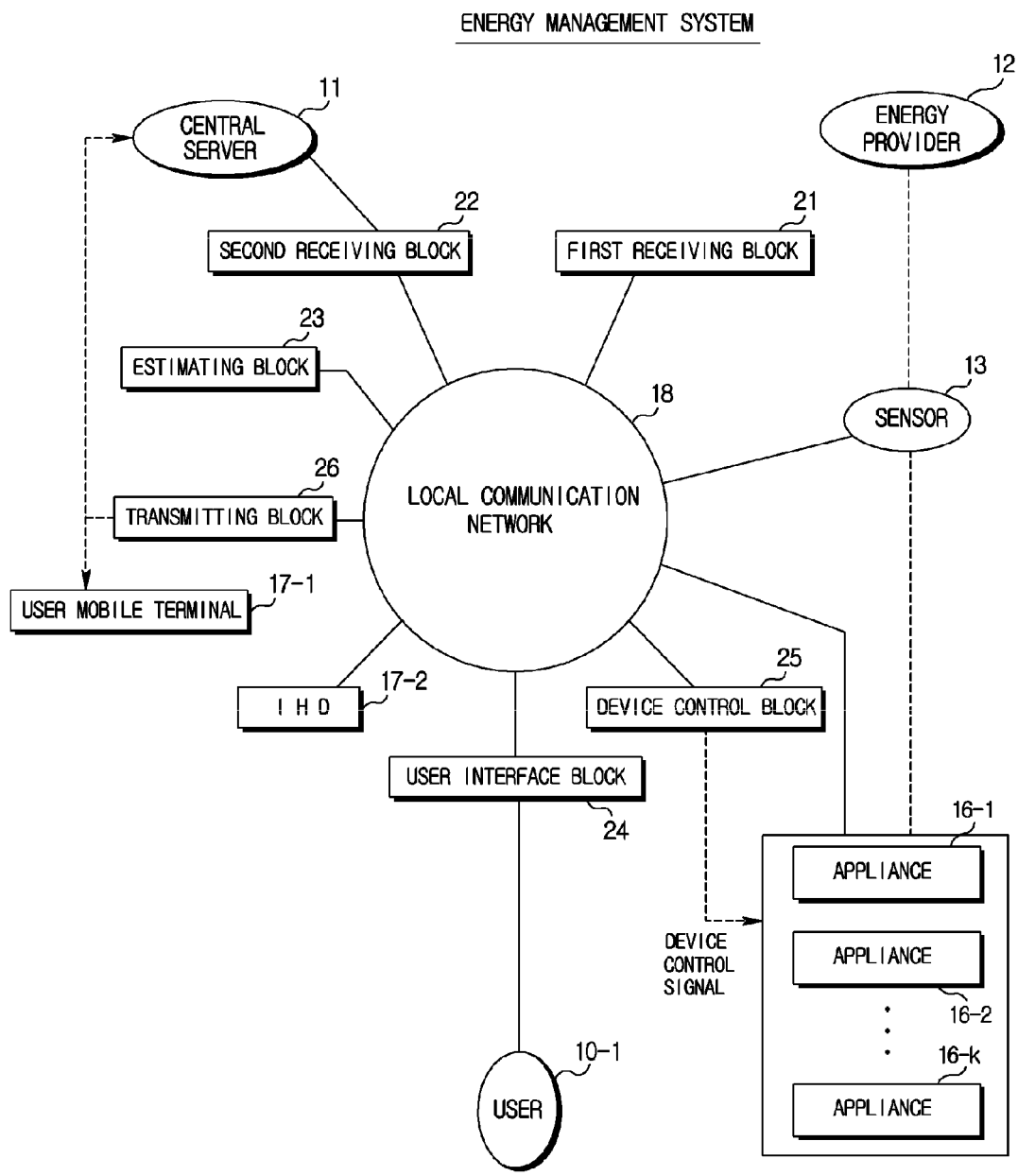
FIG. 21 shows a configuration of an energy management system according to third and fourth embodiments.

FIG. 21 shows an energy management system according to third and fourth embodiments and the energy management system at least includes a first receiving block 21, a second receiving block 22, and an estimating block 23.

In the energy management system, the first receiving block 21 receives information related to energy use from a sensor 13. The second receiving block 22 receives information related to energy charge from a central server 11 or a user 10-1.

The first receiving block 21, the second receiving block 22, and the estimating block 23 included in the energy management system perform substantially same operations of those included in the energy management apparatus 20-3 according to the third embodiment of the present invention or the energy management apparatus 20-4 according to the fourth embodiment of the present invention. Detailed description about processes for estimating energy use or energy cost at a forthcoming timing in the future is omitted because of avoiding duplication.

The energy management system may further include a user interface block 24, a device control block 25, transmitting block 26, and combinations thereof.

In the energy management system, the first receiving block 21, the second receiving block 22, the estimating block 23, the user interface block 24, the device control block 25, and the transmitting block 26 are separately configured and exchange information through a local communication network 18, for example, a home network system.

Meanwhile, one or more operations of the first receiving block 21, second receiving block 22, estimating block 23, user interface block 24, device control block 25 and transmitting block 26 of the energy management system may be performed in integration in a single device.

In an example of the former, a PC or a digital TV system may be used as the user interface block 24. As the device control block 25, main controller included in a home network system (not shown) controlling or managing each of appliances 16-1 to 16-$k$ may be used.

The local communication network 18 may be configured in various communication schemes such as a wire/wireless local communication, a power line communication, and so on.

Herein, the local communication network 18 includes a physical network coupled to each appliance included in a place of energy consumption as well as an application network for respectively and independently transmitting information to each other.

Other components of the energy management system according to this embodiment of present invention are similar to those in the above embodiments of the present invention, and thus their detailed description will be omitted.

Figure 22:
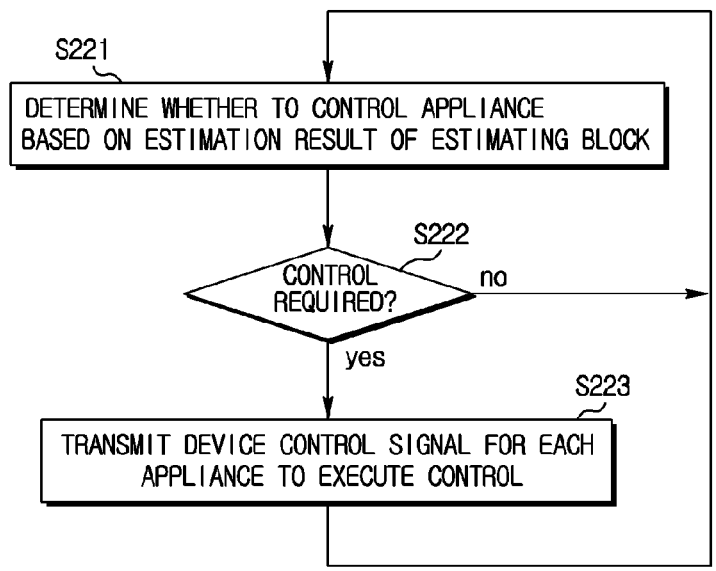
FIGS. 22 and 23 show roles of a device control block.
Figure 23:
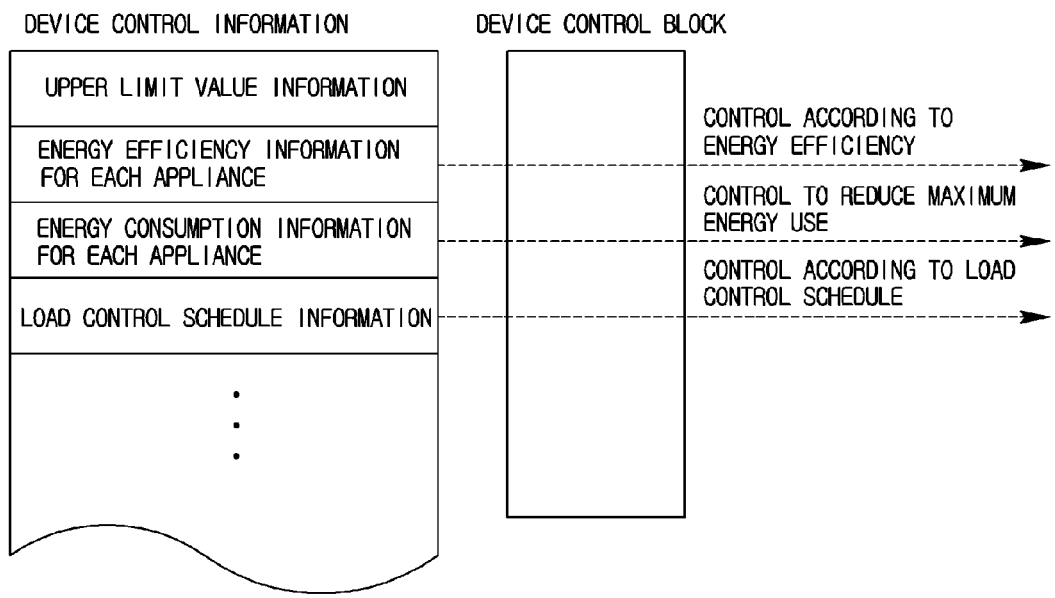

FIGS. 22 and 23 describe the device control block 25. Referring to FIG. 22, in the step S221, the device control block 25 determines control of each appliance according to the future energy use or energy charges that the estimating block 23 estimates.

In the step S222, if it is required to control appliance based on decision of the step S221, the device control block 25 outputs a device control signal in order to perform control of each appliance in the step S223.

In the step 221, there are various ways for the device control block 25 to determine when it is required to control of each appliance.

For example, the device control block determines that it is required to control of each appliance when forthcoming energy use or energy cost estimated by the estimating block 23 is over a predetermined ceiling value.

Herein, the ceiling value may be fixed value, or be set by a user through the user interface block 24.

Further, in the step 223, there are various ways for the device control block 25 to determine which appliance is controlled.

Referring to FIG. 23, the device control determines which appliance is controlled by using information for device control, including energy efficiency information of each appliance, energy use information of each appliance, a load control schedule information, and so on, which is previously fixed or changeable through be setting via the user interface block 24 by a user.

For example, the device control block 25 may preferentially block off the energy supply to an appliance having poorer energy efficiency ratio than other appliances.

Also, the device control block 25 may preferentially block off the energy supply to an appliance more reducing the maximum energy use than other appliances.

Herein, as a critical factor to determine which appliance may more reduce the maximum energy use than other appliances, energy efficiency information of each appliance or energy use information of each appliance is used.

Further, the device control block 25 may block off the energy supply to the appliance according to a predetermined load control schedule set by a user. Herein, the load control schedule includes a sequence or an order of appliances to provide or block energy.

In a case that the appliances 16-1 to 16-$k$ include an electrical appliance, the device control block 25 may transmit a device control signal to a power switching device configured to turn on/off a corresponding electrical appliance.

Here, the power switching device having various structures or components may operate to turn on/off a power supplied to each appliance according to a device control signal outputted from the device control block 25.

A method, where the device control block 25 controls each appliance according to the future energy use or energy charges the estimating block 23 has estimated, may be variously provided depending on the case.

As one example, the device control block 25 maintains a predetermined upper limit value of energy use or energy charges. At this point, the upper limit value may be set by a user through the user interface block 24.

Figure 24:
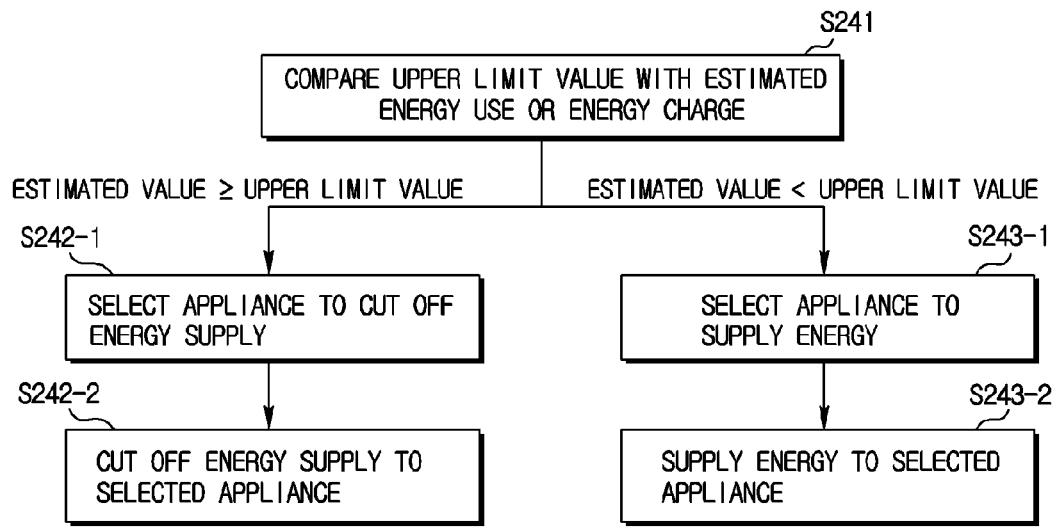
FIG. 24 shows operations of a device control block.

Referring to FIG. 24, a specific example of performing control for energy use or energy charges not to depart from an upper limit value will be described below.

In the step S241, the device control block 25 compares the energy use or energy charges the estimating block 23 has estimated with an upper limit value a user has set.

If the comparison value in the step S241 is more than the upper limit value, the device control block 25 selects an appliance to cut off energy supply in the step S242-1 and cuts off energy to the appliance in the step S242-2.

However, if the comparison value in the step S241 is less than the upper limit value, the device control block 25 selects an appliance to supply energy in the step S243-1 and supplies the energy to the appliance in the step S243-2.

These procedures may be performed each time the estimating block 23 newly estimates the future energy use or energy charges, and for this, the estimating block 23 may estimate the future energy use or energy charges periodically.

There may be appliances that the device control block 25 can/cannot control and an appliance, a control target of the device control block 25, may be set by a user through the user interface block 24.

Figure 25:
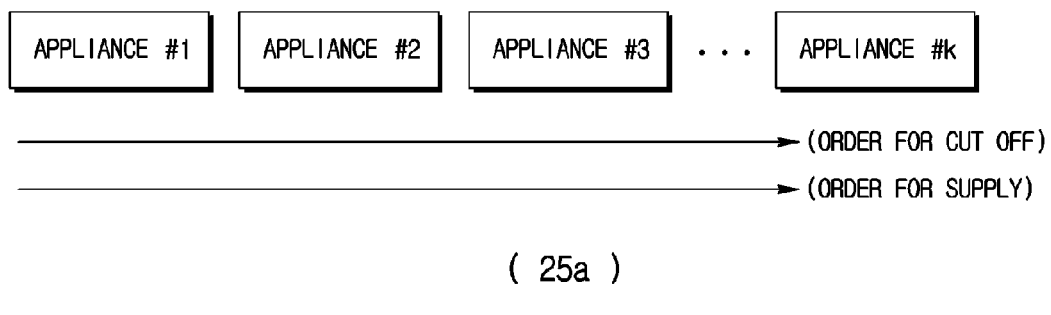
FIG. 25 shows a method for selecting an electrical appliance to be controlled.
Figure 25:
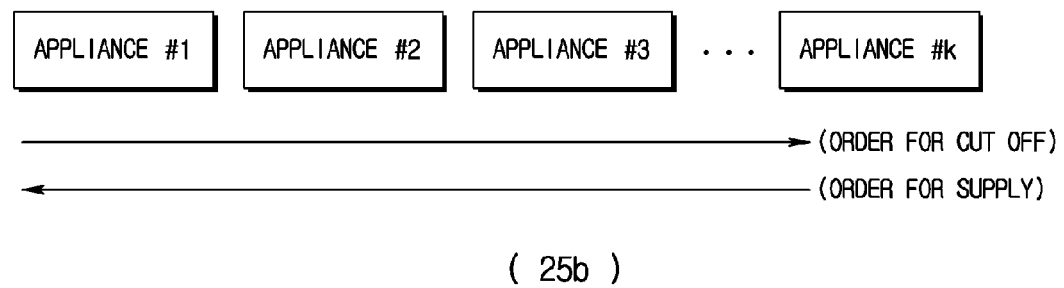

In the steps S241-1 and S243-1 of FIG. 24, which appliance is selected for a control target may be diversely configured depending on the case and FIG. 25 shows a circulation control method and a priority control method.

FIG. 25a shows the circulation control method. Each energy appliance is sequentially controlled and energy is supplied to an appliance first, whose energy is cut off first before.

FIG. 25b shows the priority control method. Priority is set according to importance of each appliance. Thus, energy supply is cut off to an appliance having a low priority and energy supply is provided to an appliance having a high priority. That is, energy supply is provided to an appliance first, whose energy is cut off later.

The priority of each appliance may be diversely set as a user directly designates the priority with a load control schedule, appliance having poor energy efficiency is set with a low priority, or appliance having high power consumption is set with a low priority.

At this point, a user may set through the user interface block 24 device control information such as load control schedule information, energy efficiency information for each appliance, energy consumption information for each appliance, and a control method (e.g., circulation control or priority control).

Additionally, the priority of each appliance may be dynamically set according to a state of each appliance.

For example, if energy use is separately obtained with a sensor in each appliance, an appliance having big changes of energy use may be set with a low priority. If so, an appliance having big changes of energy use is cut from power first and energy supply is resumed later.

A time interval at which control is performed for each appliance may vary depending on the case.

For example, after cutting off energy supply to an appliance, energy is supplied to the corresponding appliance again as a predetermined time slot elapses or after supplying energy to an appliance, energy supply is cut off to the corresponding appliance as a predetermined time slot elapses.

Moreover, as described above, the estimating block 23 may perform an estimation periodically and in this case, when the estimating block 23 newly perform an estimation, a control may be made for an appliance.

Figure 26:
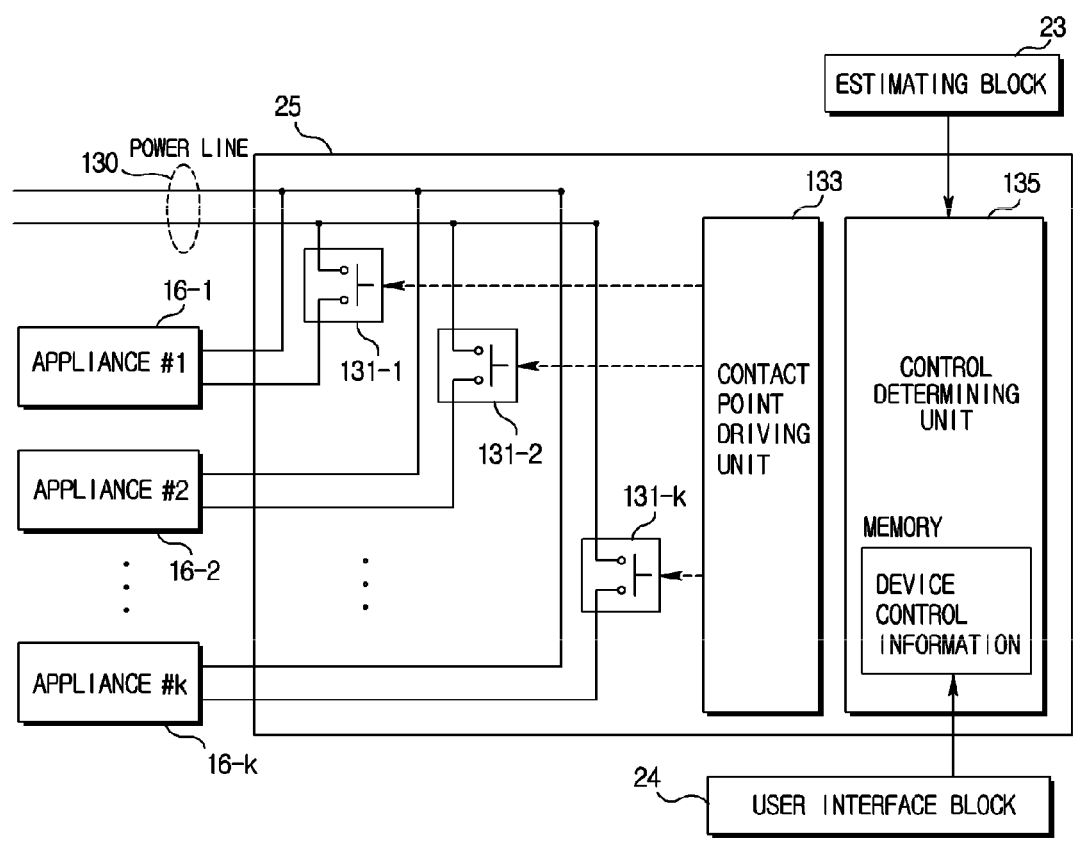
FIG. 26 shows a method for controlling an electrical appliance.

FIG. 26 shows a method of controlling an appliance when the device control block 25 directly controls a contact point of a power line 130 leading in each appliance. The device control block 25 includes contact points 131-1 to 131-$k$ connecting or disconnecting the power line 130 to or from each of appliances 16-1 to 16-$k$, a contact point driving unit 133, and a control determining unit 135.

The control determining unit 135 determines whether to control an appliance according to a result value that the estimating block 23 estimates and selects a control target with reference to memory having device control information.

Then, the control determining unit 135 issues a command on the contact point unit 133 to connect or disconnect the contact points corresponding to the selected appliance and the contact point driving unit 133 connects or disconnects a corresponding contact point in response to the command.

Figure 27:
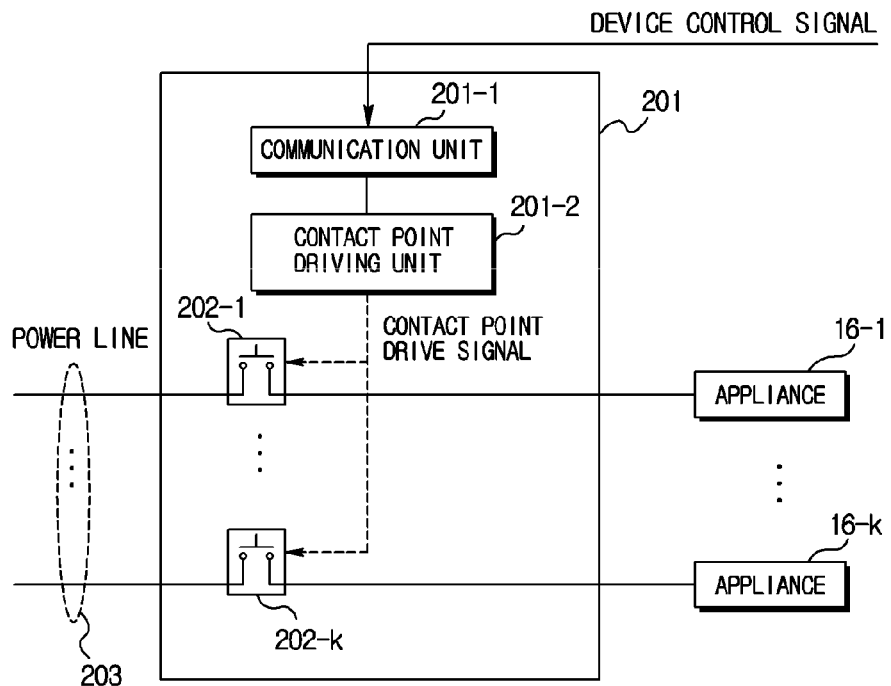
FIG. 27 shows a power switching device.
Figure 27:
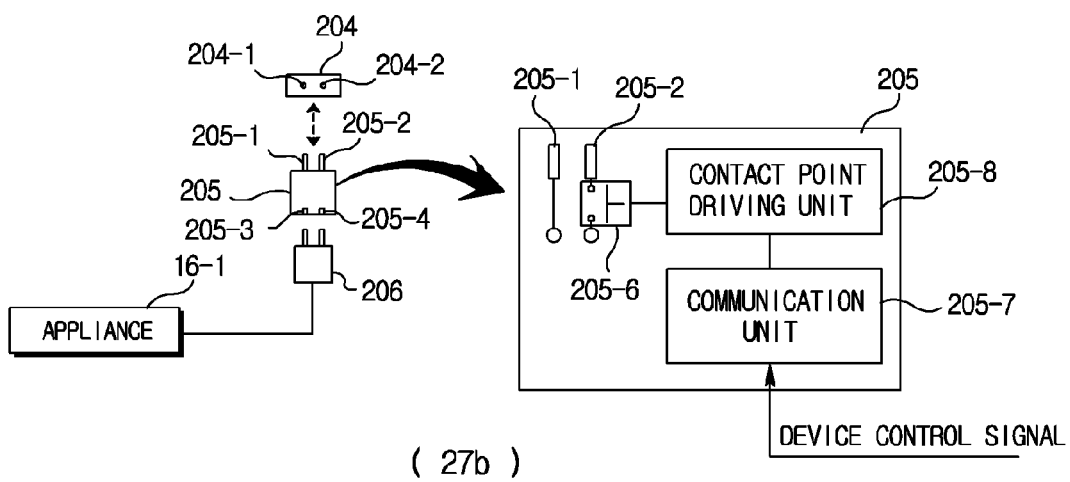

FIG. 27 shows power switching devices 201 and 205.

Referring to FIG. 27a, the power switching device 201 includes plural points of contact 202-1 to 202-k for connecting or floating a power leading-in cable 203 to each appliance.

A communicating block 201-1 receives the device control signal outputted from the device control block 25 and delivers into a contact-point control block 201-2. According to the device control signal, the contact-point control block 201-2 enables the points of contact 201-1 to 202-k in each power leading-in cable 203 to be connected or floated so that it is determined to control a power supply or block to each appliance 16-1 to 16-k.

Referring to FIG. 27b, a power switching device 205 includes a fastening pin 205-1, 205-2 which is removable to a fastening hole 204, 204-2 of a wall socket 204 or a multi outlet coupled to a wall socket 204, and a fastening hole 205-3, 205-4 coupled with a power plug 206 of appliance 16-1.

A communication block 205-7 of the power switching device 205 receives the device control signal outputted from the device control block 25 and delivers into a contact-pint control block 205-8. According to the device control signal, the contact-point control block 205-8 enables the points of contact 205-6 to be connected or floated so that it is determined to control a power supply or block to a corresponding appliance 16-1.

The power switching device 205 described referring to FIG. 27b may be included in each appliance.

In order to independently or respectively control each appliance 16-1 to 16-k, the device control block 25 recognizes which appliance is coupled to each point of contact 202-1 to 202-k shown in FIG. 27a or each power switching device 205 shown in FIG. 27b.

In one example, it is previously determined which type of appliance is coupled to each point of contact 202-1 to 202-k shown in FIG. 27a.

In another example, a user may set via the user interface block 24 which appliance is coupled to the contact points 202-1 to 202k of FIG. 27a or the power switching device 205 of FIG. 27b.

Figure 28:
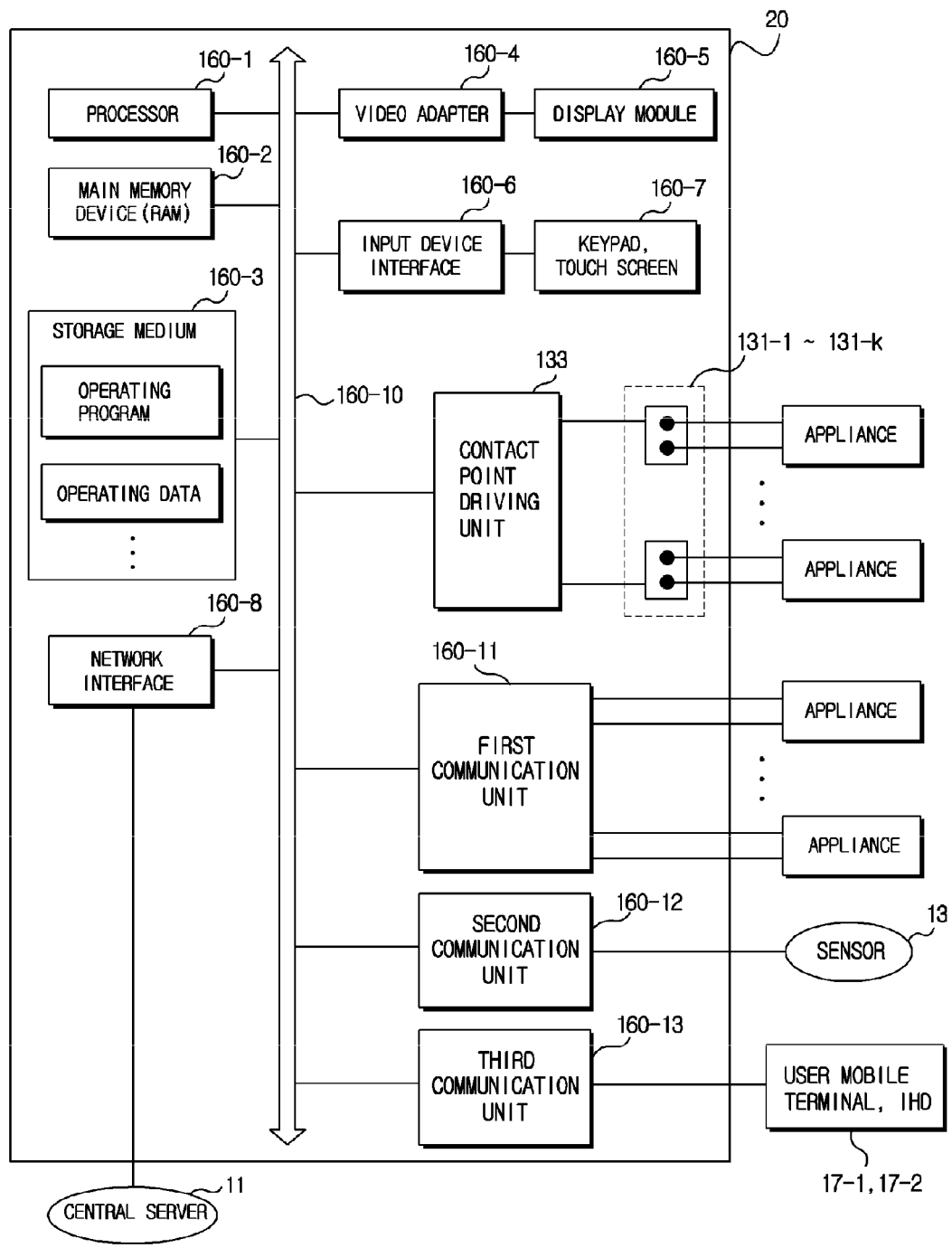
FIG. 28 shows a configuration of an energy management apparatus according to an embodiment of the present invention.

FIG. 28 shows a configuration of an energy management apparatus 20 according to an embodiment of the present invention.

A processor 160-1 may be configured with a central processing unit (CPU) or a microprocessor and overall controls the energy management apparatus 20 while exchanging information with each element via system bus 160-10 having various structures.

A random access memory (RAM) 160-2 as a main memory device temporarily stores programs or data to be instantly accessed by the processor 160-1.

A video adapter 160-4 visually outputs an operating status of the energy management apparatus 20 or information to be displayed to a user through a display module 160-5 and the display module 160-5 may have various types and structures such as a liquid crystal display (LCD) or a light emitting diode (LED).

An input device interface 160-6 enables a user to input information or commands related to operations of the energy management apparatus 20 through various input devices 160-7 such as a keypad or a touch screen.

A network interface 160-8 enables the energy management apparatus 20 to communicate with other servers via a communication network. An example of the server may include the above-mentioned central server 11.

A contact point driving unit 133 connects or disconnects the contact points 131-1 to 131-k of a power line connected to each appliance as shown in FIG. 13. A first communication unit 160-11 transmits a device control signal to each appliance connected through a communication interface.

A second communication unit 160-12 is connected to the sensor 13 and receives energy-related data from the sensor 13 and a third communication unit 160-13 transmits energy use information to a user's mobile terminal 17-1 or an IHD 17-2.

The first communication unit 160-11, the second communication unit 160-12, and the third communication unit 160-13 may have diverse communication interface structures such a wire serial communication, a wireless near field communication, a power line communication depending on the case, and especially, the third communication unit 160-13 may be configured to interface with a wide area network such as a mobile communication network.

A storage device 160-3 may store operating programs, and a variety of data to operate the energy management apparatus.

A storage device 160-3 may include a read only memory (ROM); but preferably, include a nonvolatile memory device which is readable and writable because data or information may be often stored or deleted and should be maintained regardless condition of power supply. The storage device 160-3 may have various structures such as an internal-type, an external-type, a separate-type, a united-type and other-type one.

An operating program stored in the storage device 160-3 is a kind of computer program for performing functions of the energy management apparatus 20.

There are diverse kinds of operating programs including at least a program module for performing operations of the first receiving block 21 and a program module for performing operations of the estimating block 23.

Further, the operating program may include another program module to control the user interface block 24 for an interface with a user, another program module to control the device control block 25, and another program module to control the transmitting block 26.

If the energy management apparatus 20 starts to operate, the processor 160-1 transfers and stores an operating program stored in the storage medium 160-3 to and in the main memory device 160-2 and then executes the stored operating program, thereby to control operations of the energy management apparatus 20 in each of the embodiments described above or below.

Figure 29:
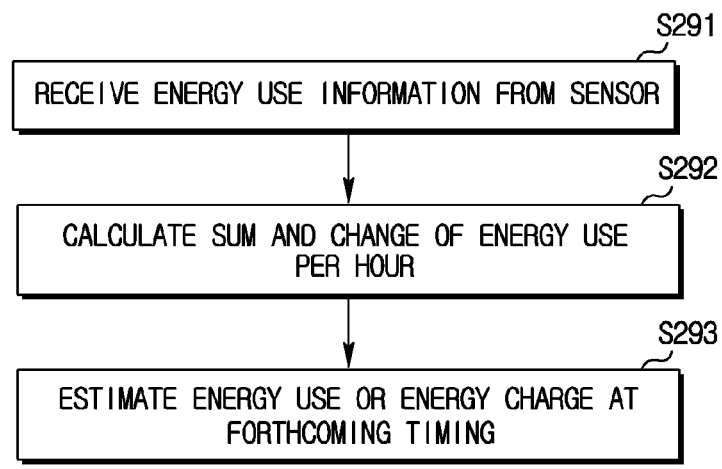
FIG. 29 shows an energy management method according to a first embodiment of the present invention.

FIG. 29 is a flowchart showing an energy management method according to an embodiment of the present invention.

In the step S291, the energy-related data including energy use information are received from at least one sensor.

The sensor includes a device monitoring or detecting various information regarding of energy use such as a meter measuring an energy use. For example, a smart meter may be included in the sensor. The information of energy use or consumption may be provided from each appliance or total amount of all appliances therein.

Then, in the step 292, a sum and a change of energy use in each predetermined time slot is recognized, and a variation rate of the energy use is calculated.

In the step 292, the sum of energy use in each predetermined time slot includes the sum of amounts of energy used in each predetermined time slot.

That is, if each time slot is an hour, the sum of energy use in each hour is recognized; otherwise, if each time slot is a day, the sum of energy use in each day is recognized.

Then, by using the sum of energy use, the change and the variation rate of energy use may be calculated.

In the step 293, based on the sum and the change of energy use in each time slot calculated in the step S292, energy use and energy cost at forthcoming timing after a predetermined time slot are estimated.

Herein, the term 'after the predetermined time slot' means a time in the future when it is required to check energy use or energy charges; and the predetermined time slot may be set by a day, a week, a month, a year or fixed as a certain time in the future.

For example, the certain time is considered as user's payment day or the last day of each month.

There may be various approaching methods for estimating forthcoming energy consumption or energy cost by using the sum and the change of energy use and the energy differential rate in the step S293.

These approaching methods are substantially similar to those operations of the estimating block 23 included in the energy management apparatus 20-1 according to an embodiment of the present invention. Thus, for avoiding duplication, a general description is given.

In the step 293, a sum of energy use in the future may be estimated by using various linear or non-linear approaching methods shown in FIGS. 2a, 3a, 4a, and 5a.

If the sum of energy use in the future is estimated, total energy cost may be estimated according to an energy rate or price.

At this point, energy price information may be received from a central server an energy provider operates and maintains over a communication network or may be inputted by a user.

When the energy rate is fixed, the total energy cost may be estimated by multiplying the estimated sum of energy use with the energy rate.

However, if a differential rate or schedule such as a cumulative use pricing, a time of use pricing, a critical peak pricing, a real-time pricing and so on is applied to the energy rate, total energy cost may be estimated by using a method shown in the equation 5 or a bipartite correspondence between total energy use and total energy cost shown in FIGS. 6 and 7.

Referring to embodiment shown in FIGS. 8a, 9a, 10a, and 11a, in a case that there is an alternative energy source in the place of energy consumption, it is described that total energy use at a forthcoming timing in the future may be reduced rather than total energy use at the present timing. Accordingly, like embodiments shown in FIGS. 6b and 7b, total energy cost in the future may decrease.

Figure 30:
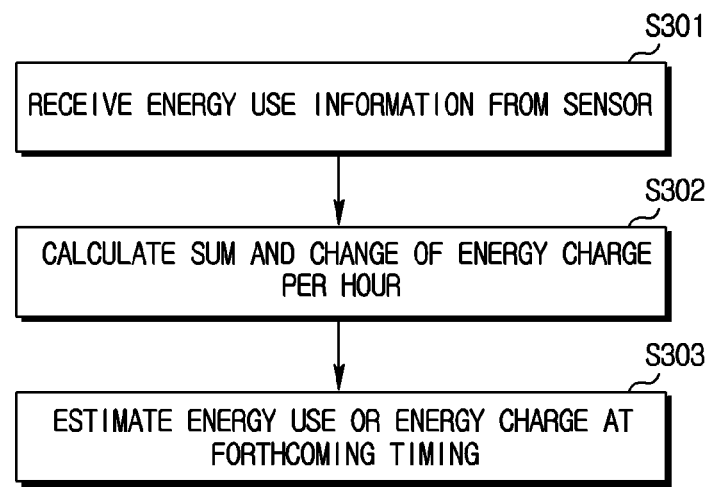
FIG. 30 shows an energy management method according to a second embodiment of the present invention.

FIG. 30 is a flowchart showing an energy management method according to second embodiment of the present invention.

In the step S301, energy-related data including energy use information are received from at least one sensor.

The sensor includes a device monitoring or detecting various information regarding of energy use such as a meter measuring an energy use. For example, a smart meter may be included in the sensor. The information of energy use or consumption may be provided from each appliance or total amount of all appliances therein.

Then, in the step 302, a sum of energy use in each predetermined time slot and variation rate of energy use is calculated.

In the step 302, the sum of energy use in each predetermined time slot includes the sum of amounts of energy used in each predetermined time slot. That is, if each time slot is an hour, the sum of energy use in each hour is recognized; otherwise, if each time slot is a day, the sum of energy use in each day is recognized.

Then, by using the sum of energy use, the change and the variation rate of energy use may be calculated. At this point, energy price information may be received from a central server an energy provider operates and maintains over a communication network or may be inputted by a user.

In the step 303, based on the sum and the variation rate of energy use in each time slot calculated in the step S302, energy use and energy cost at forthcoming timing after a predetermined time slot are estimated.

Herein, the term 'after the predetermined time slot' means a time in the future when it is required to check energy use or energy charges; and the predetermined time slot may be set by a day, a week, a month, a year or fixed as a certain time in the future.

For example, the certain time is considered as user's payment day or the last day of each month.

In the step 303, there may be various approaching methods for estimating forthcoming energy consumption or energy cost by using the sum and the change of energy use and the energy differential rate.

These approaching methods are substantially similar to those operations of the estimating block 23 included in the energy management apparatus 20-2 according to another embodiment of the present invention. Thus, for avoiding duplication, a general description is given.

In the step 303, a sum of energy cost in the future may be estimated by using various linear or non-linear approaching methods shown in FIGS. 2b, 3b, 4b, and 5b.

If the sum of energy cost in the future is estimated, total energy use may be estimated according to an energy rate or price.

When the energy rate is fixed, the total energy use may be estimated by dividing the estimated sum of energy cost by the energy rate.

However, if a differential rate or schedule such as a cumulative use pricing, a time of use pricing, a critical peak pricing, a real-time pricing and so on is applied to the energy rate, total energy cost may be estimated by using a method shown in the equation 12 or a bipartite correspondence between total energy use and total energy cost shown in FIGS. 13 and 14.

Referring to embodiment shown in FIGS. 8b, 9b, 10b, and 11b, in a case that there is an alternative energy source in the place of energy consumption, it is described that total energy cost at a forthcoming timing in the future may be reduced rather than total energy cost at the present timing. Accordingly, like embodiments shown in FIGS. 13b and 14b, total energy use in the future may decrease.

Figure 31:
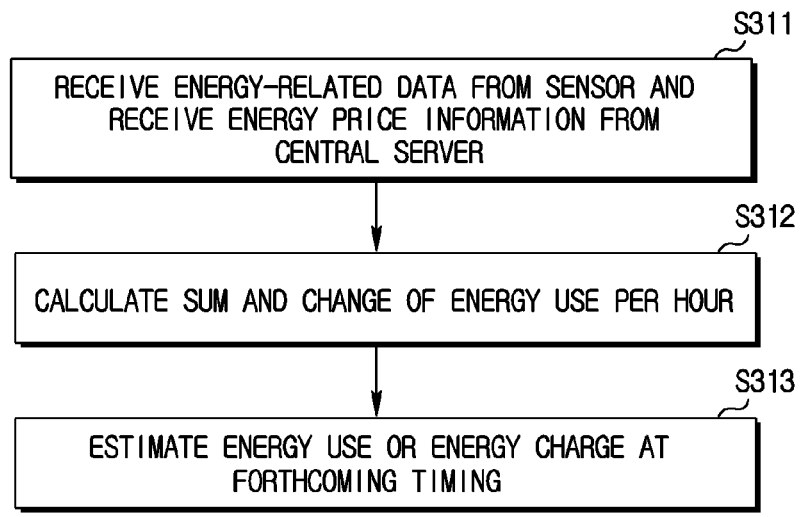
FIG. 31 shows an energy management method according to a third embodiment of the present invention.

FIG. 31 is a flowchart showing an energy management method according to third embodiment of the present invention.

In the step S311, energy-related data including energy use information are received from at least one sensor and energy price information per predetermined time slot is received from a central server. At this point, the energy price information per predetermined time slot may be directly inputted by a user.

The sensor includes a device, monitoring or detecting various information regarding of energy use, such as a meter measuring an energy use. For example, a smart meter may be included in the sensor. The information of energy use or consumption may be provided from each appliance or total amount of all appliances therein.

Then, in the step 312, a sum and a change of energy use per predetermined time slot is recognized, and a variation rate of energy use is calculated.

In the step 312, the sum of energy use in each predetermined time slot includes the sum of amounts of energy used per predetermined time slot. That is, if each time slot is an hour, the sum of energy use in each hour is recognized; otherwise, if each time slot is a day, the sum of energy use in each day is recognized.

Then, the change and variation rate of energy use may be calculated with the sum of energy use.

In the step 313, based on the sum and change of energy use in each time slot calculated in the step S312, energy use and energy cost at forthcoming timing after a predetermined time slot are estimated.

Herein, the term 'after the predetermined time slot' means a time in the future when it is required to check energy use or energy charges; and the predetermined time slot may be set by a day, a week, a month, a year or fixed as a certain time in the future. For example, the certain time is considered as user's payment day or the last day of each month.

There may be various approaching methods for estimating forthcoming energy consumption or energy cost by using the sum and change of energy use and the energy differential rate in the step S313.

These approaching methods are substantially similar to those operations of the estimating block 23 included in the energy management apparatus 20-3 according to the third embodiment of the present invention. Thus, for avoiding duplication, a general description is given.

In the step 313, the sum of energy use in the future may be estimated by using various linear or non-linear approaching methods shown in FIGS. 2a, 3a, 4a, and 5a.

If the sum of energy use in the future is estimated, total energy cost may be estimated according to an energy rate or price.

When the energy rate is fixed, the total energy cost may be estimated by multiplying the estimated sum of energy use with the energy rate.

However, if a differential rate or schedule such as a cumulative use pricing, a time of use pricing, a critical peak pricing, a real-time pricing and so on is applied to the energy rate, total energy cost may be estimated by using a method shown in the equation 5 or a bipartite correspondence between total energy use and total energy cost shown in FIGS. 6 and 7.

Referring to embodiment shown in FIGS. 8a, 9a, 10a, and 11a, in a case that there is an alternative energy source in the place of energy consumption, it is described that total energy use at a forthcoming timing in the future may be reduced rather than total energy use at the present timing. Accordingly, like embodiments shown in FIGS. 6b and 7b, total energy cost in the future may decrease.

Figure 32:
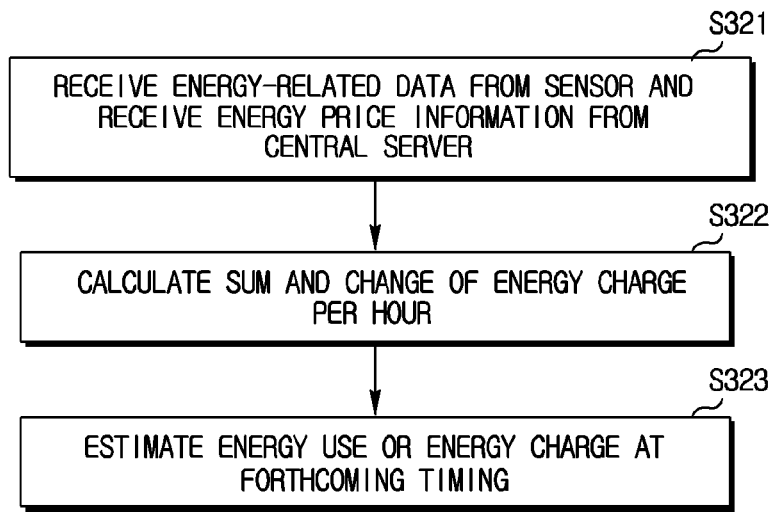
FIG. 32 shows an energy management method according to a fourth embodiment of the present invention.

FIG. 32 is a flowchart showing an energy management method according to a fourth embodiment of the present invention.

In the step S321, energy-related data including energy use information are received from at least one sensor and energy price information per predetermined time slot is received from a central server. At this point, the energy price information per predetermined time slot may be directly inputted by a user.

The sensor includes a device, monitoring or detecting various information regarding of energy use, such as a meter measuring an energy use. For example, a smart meter may be included in the sensor. The information of energy use or consumption may be provided from each appliance or total amount of all appliances therein.

In the step 322, the sum of energy charges per predetermined time slot and its variation rate are calculated.

The sum of energy charges for predetermined time slot in the step of 322 includes a sum of energy charges in each predetermined time slot.

That is, if each time slot is an hour, the sum of energy use in each hour is recognized; otherwise, if each time slot is a day, the sum of energy use in each day is recognized. Then, the change and variation rate of energy use may be calculated with the sum of energy use.

In the step 323, based on the sum and change of energy use in each time slot calculated in the step S332, energy use and energy cost at forthcoming timing after a predetermined time slot are estimated.

Herein, the term 'after the predetermined time slot' means a time in the future when it is required to check energy use or energy charges; and the predetermined time slot may be set by a day, a week, a month, a year or fixed as a certain time in the future. For example, the certain time is considered as user's payment day or the last day of each month.

There may be various approaching methods for estimating forthcoming energy consumption or energy cost by using the sum and change of energy use and the energy differential rate in the step S323.

These approaching methods are substantially similar to those operations of the estimating block 23 included in the energy management apparatus 20-4 according to the fourth embodiment of the present invention. Thus, for avoiding duplication, a general description is given.

In the step 323, a sum of energy use in the future may be estimated by using various linear or non-linear approaching methods shown in FIGS. 2b, 3b, 4b, and 5b.

If the sum of energy use in the future is estimated, total energy cost may be estimated according to an energy rate or price.

When the energy rate is fixed, the total energy cost may be estimated by multiplying the estimated sum of energy use with the energy rate.

However, if a differential rate or schedule such as a cumulative use pricing, a time of use pricing, a critical peak pricing, a real-time pricing and so on is applied to the energy rate, total energy cost may be estimated by using a method shown in the equation 12 or a bipartite correspondence between total energy use and total energy cost shown in FIGS. 13 and 14.

Referring to embodiment shown in FIGS. 8b, 9b, 10b, and 11b, in a case that there is an alternative energy source in the place of energy consumption, it is described that total energy use at a forthcoming timing in the future may be reduced rather than total energy use at the present timing. Accordingly, like embodiments shown in FIGS. 13b and 14b, total energy cost in the future may decrease.

The energy management methods according to the first to fourth embodiments of the present invention may further comprise a device control step of controlling energy supply to at least one appliance according to the energy consumption or the energy cost estimated from the estimating steps S293, S303, S313, and S323.

Further, the energy management methods according the first to fourth embodiments to the present invention may further comprise a step of transmitting information related to the energy use to various other devices.

Figure 33:
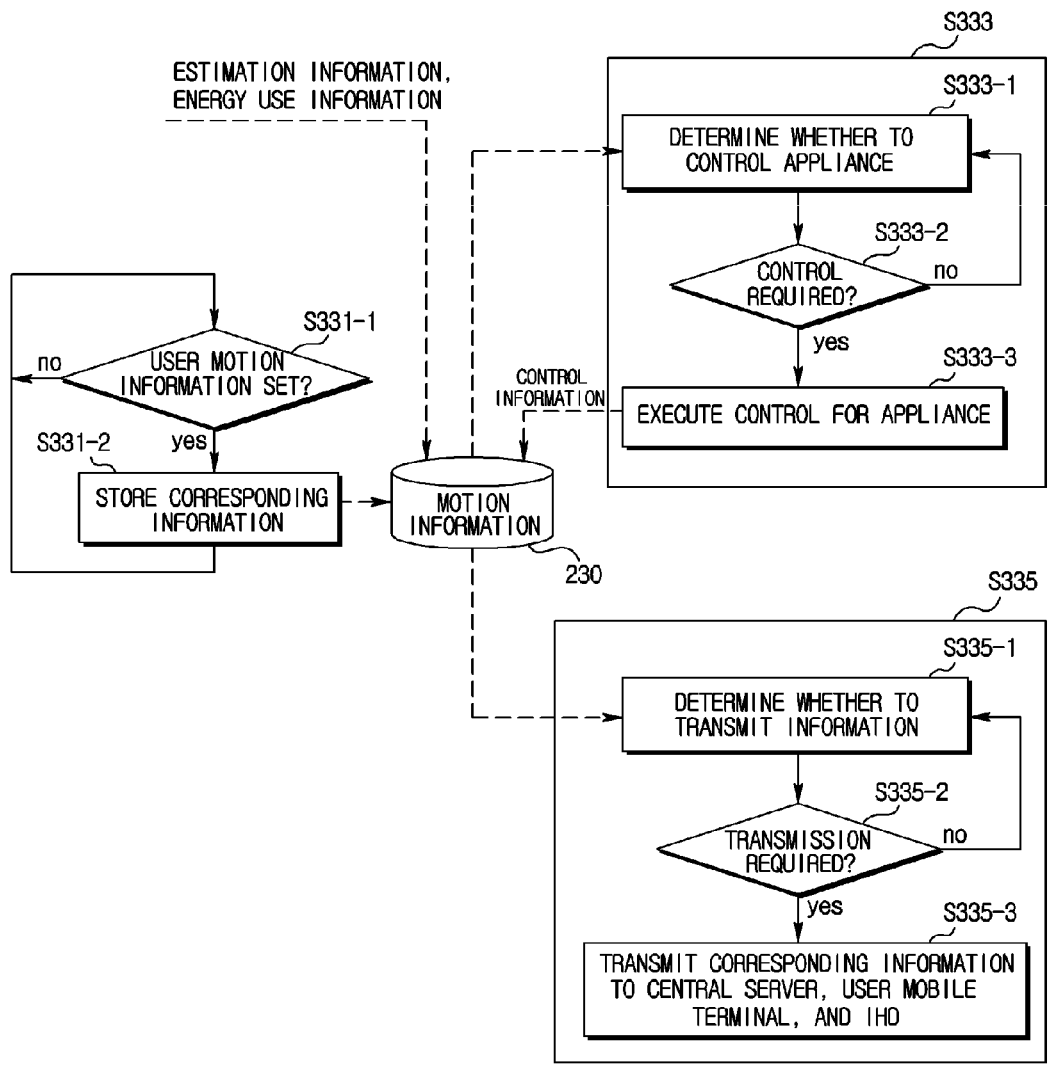
FIG. 33 shows an energy management method according to a modification of the first to fourth embodiments of the present invention.

FIG. 33 is a flowchart showing an energy management method according to another embodiment of the present invention. Referring to FIG. 33, detailed embodiments of the device control step S333 and the transmitting step S335 are described.

An apparatus or a system operating based on the energy management method according to the present invention provides a user interface configured to input information in response to user's command for setting operation parameter in the step S331-1, and stores the operation parameter inputted through the user interface by a user in the step S331-2.

There is various-type information inputted through the user interface by a user, as occasion demands.

For example, information for recognizing excess of energy use includes energy efficiency information of each appliance, energy use information of each appliance, load control schedule information, a mobile terminal number receiving a warning message, and so on.

In the device control step S333, it is determined whether control of each appliance according to estimated forthcoming energy use or cost provided is performed in the step S333-1.

According to decision of the step 333-1, if it is required to control energy supply to each appliance in the step 333-2, control of energy supply to corresponding appliance is performed in the step S333-3.

In the step S333-1, there are many ways to determine when control of energy supply to any appliance is required.

For example, if estimated energy consumption or cost is over a predetermined ceiling value, it is determined that control of energy supply to a corresponding appliance is required.

Herein, the ceiling value is previously fixed or set by a user through the steps S331-1 and S331-2

In the step S333-3, there are various ways to determine which appliance is controlled.

For example, energy supply to an appliance having poorer energy efficiency ratio than other appliances may be preferentially blocked off, or the energy supply to an appliance more reducing the maximum energy use than other appliances may be preferentially blocked off.

For another example, according to a predetermined load control schedule, the energy supply to the appliance may be blocked off. Herein, the load control includes a sequence or an order of appliances to provide or block energy.

In a case that the appliance controlled by the device control step S333 includes an electrical appliance, the device control step S333 may transmit a device control signal to a power switching device configured to turn on/off a corresponding electrical appliance.

The power switching device may be configured variously and differently; one of embodiment is described in FIG. 27.

In the step S335, an apparatus or a system operating based on the energy management method according to the present invention determines whether is required to transmit various-type information such as an estimated forthcoming energy use or cost is performed in the step S335-1.

According to decision of the step 335-1, if it is required to transmit the information in the step S335-2, the information is outputted to other devices such as central server, user's mobile terminal, IHD, and etc. in the step S335-3.

In the step S335, as occasion demands, it is constructed in various ways to determine when any information is transmitted to any device.

For example, as information transmitted in the step S335, there is at least one of information related to energy use or energy charge in the present, the energy consumption and the energy cost estimated by the estimating block 23, and so on. The information related to energy use or energy charge in the present and the information the energy consumption and the energy cost in the future may be provided as a united value of all appliance or a separate value for each appliance.

This information may be transmitted to the central server 11, user mobile terminal 17-1, an In Home Display (IHD) device 17-2, and etc.

For another example, as other information transmitted in the step S335, there is a warning message.

For instance, if the estimated future energy consumption or the energy cost is over a predetermined ceiling value, a warning message may be transmitted to user's mobile terminal, an In Home Display (IHD) device, and so on.

Herein, the ceiling value is previously set as average value or set by a user. Also, the predetermined ceiling value is determined by a ceiling value of energy use at a predetermined timing or during a predetermined period.

In the transmitting step S335, information related to a result of controlling the appliance in the device control step 333 may be transmitted. For example, information about which appliance is turned on/off, may be transmitted to the central server, user's mobile terminal, an In Home Display (IHD) device and so on.

Figure 35:
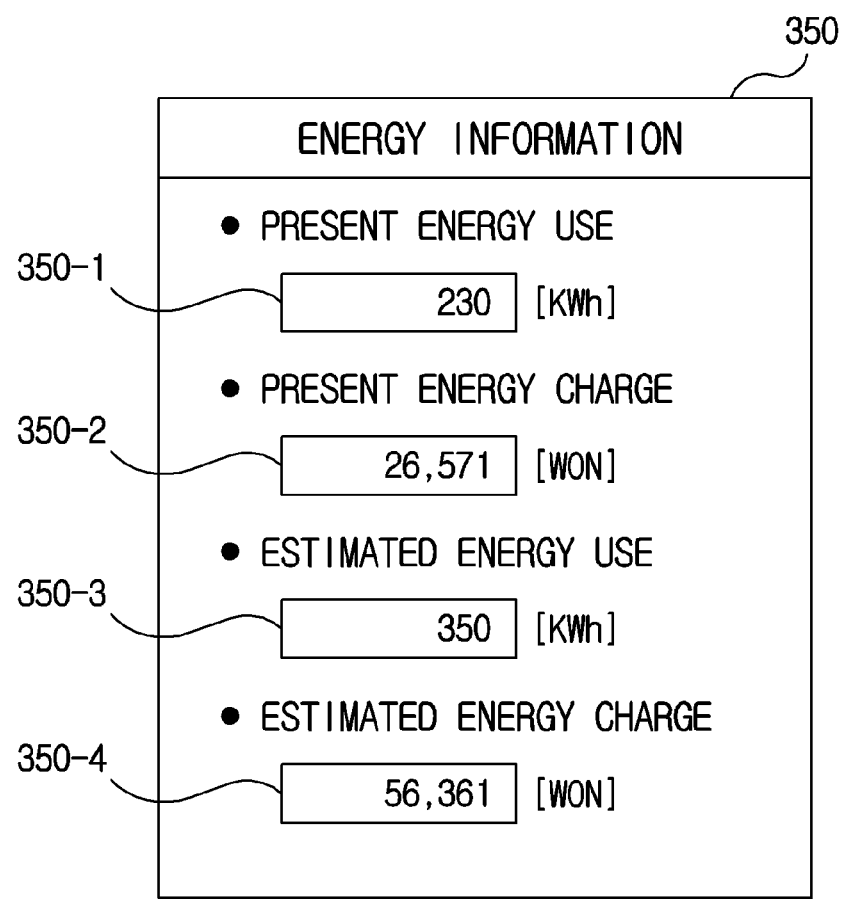
FIG. 35 shows a display screen on which energy use information is displayed.

FIG. 35 describes a display screen showing information related to energy use according to an embodiment of the present invention. Particularly, when energy includes electricity, the display screen 350 shows information related to electricity use. There are present energy use information, present energy charge information, estimated energy use information, and estimated energy charge information, each respectively shown in items of 'Present energy use' 350-1, 'Present energy charge' 350-2, 'Estimated energy use' 350-3, and 'Estimated energy charge' 350-4 on the display screen.

Numerical figures in FIG. 35, e.g., 56,361.09 won for 'Estimated energy charge' 350-4 are above described. Herein, the numerical figures are obtained by rounding off to the nearest whole number.

This screen may be embedded in various other devices. For example, this screen may be applied to a display module 160-5 of the energy management apparatus shown in FIG. 19 or user's mobile terminal 17-1 and IHD 17-2 receiving information related to energy use through a transmitting block 26.

As described above, the present invention can estimate energy consumption and energy cost in the future based on information related to energy use of various appliances.

Particularly, the estimated information can be applied to various tasks to promote effective energy use so that a user or provider approaches rational energy consumption more actively.

For example, through selectively turning on or off various appliances in energy-consumed place such as a home, an office, a company and so on, total energy use may be restricted within a limited range.

Additionally, development and estimated result of energy use are transmitted to user's device like a mobile terminal so that user may control a style of energy use.

Furthermore, estimated results gathered from each energy-consumed place are delivered to an energy provider and used for making a plan to provide energy.

Accordingly, both an energy consumer and an energy provider can be control consumption and supply of energy in advance so that limited energy resources are more effectively used.

It will be apparent to those skilled in the art that various modifications and variation may be made in the present invention without departing from the spirit or scope of the invention. Thus, it is intended that the present invention cover the modifications and variations of this invention, provided they come within the scope of the appended claims and their equivalents.

What is claimed is:

1. An apparatus for energy management, the apparatus comprising:
a first receiver device configured to receive energy use information from at least one sensor that comprises a smart meter,
a second receiver device configured to receive energy price information over time from a user or from a central server;
an estimator device configured to:
calculate an hourly energy use amount and an hourly change of energy use based on the received energy use information, and
estimate an amount of energy use after a certain time based on the calculated hourly energy use amount and hourly change of energy use, and an amount of energy cost after a certain time based on the calculated hourly energy use amount, the hourly change of energy use, and the received energy price information; and
a controller configured to control a supply of energy to a plurality of appliances, wherein the controller is configured to cut off the supply of energy to the plurality of appliances according to a load control schedule set by a user,
wherein the first receiver device, the second receiver device, the estimator device, and the controller exchange information via a local communication network,
wherein the estimator device is configured to estimate the amount of energy use by at least a weighted method, an exponential function method, or a logarithmic function method,
wherein a value of the energy use Q3 at a time value t3 is estimated using the weighted method according to Equation 1:

$$Q3 = Q2 + C \times \frac{dQ}{dt} \times (t3 - t2),\qquad\text{[Equation 1]}$$

wherein a weight value C is set to a value according to the hourly change of energy use, Q2 is a value of the energy use at a time value t2, dQ/dt is a value of the energy use per unit time, and t2 is a time value preceding a time value t3,
wherein Q3 is estimated using the exponential function method according to Equation 2:

$$Q3=Q2+(e^{a(t3-t2)}-1),\qquad\text{[Equation 2]}$$

wherein a value of "a" is determined based on the hourly change of energy use, and
wherein Q3 is estimated using the logarithmic function method according to Equation 3:

$$Q3=Q2+\ln(a(t3-t2)+1),\qquad\text{[Equation 3]}$$

wherein a value of "a" is determined based on the hourly change of energy use.

2. The apparatus of claim 1, wherein the estimator device is further configured to:
calculate a sum of energy cost per hour and a variation rate of the energy cost per hour based on the received energy use information; and
estimate the amount of energy use or energy cost after the certain time based on the calculated sum of energy cost and variation rate.

3. The apparatus of claim 1, wherein the controller is further configured to control the supply of energy for at least one of the plurality of appliances according to the estimated amount of energy use or energy cost.

4. The apparatus of claim 3, wherein the controller is further configured to transmit a device control signal to a power switching device to turn one or more of the plurality of appliances on or off.

5. The apparatus of claim 1, further comprising:
a transmitter configured to transmit at least the estimated amount of energy use or energy cost to the central server via a communication network.

6. The apparatus of claim 5, wherein the transmitter is further configured to transmit at least the estimated amount of energy use or energy cost to a user mobile terminal or an In Home Display (IHD).

7. The apparatus of claim 6, wherein the transmitter is further configured to transmit a warning message to the user mobile terminal or the IHD when the estimated amount of energy use or energy cost is greater than an upper threshold value.

8. A method for energy management, the method comprising:
receiving energy use information from at least one sensor via a first receiver that comprises a smart meter;
calculating, via an estimator, an hourly energy use amount and an hourly change of energy use based on the received energy use information;
receiving energy price information over time from a central server or a user via a second receiver;
estimating an amount of energy use after a certain time based on the calculated hourly use amount and hourly change of energy use, and an amount of energy cost after a certain time based on the calculated hourly energy use amount, the calculated hourly change of energy use, and the received energy price information; and
controlling a supply of energy, via a controller, to a plurality of appliances including cutting off the supply of energy to the plurality of appliances according to a load control schedule set by a user;
wherein estimating the amount of energy use comprises estimating using at least a weighted method, an exponential function method, or a logarithmic function method;
wherein a value of the energy use Q3 at a time value t3 is estimated using the weighted method according to Equation 1:

$$Q3 = Q2 + C \times \frac{dQ}{dt} \times (t3 - t2),\qquad\text{[Equation 1]}$$

where a weight value C is set to a value according to the hourly change of energy use, Q2 is a value of the energy use at a time value t2, dQ/dt is a value of the energy use per unit time, and t2 is a time value preceding a time value t3, and
wherein Q3 is estimated using the exponential function method according to Equation 2:

$$Q3=Q2+(e^{a(t3-t2)}-1),\qquad\text{[Equation 2]}$$

where a value of "a" is determined based on the hourly change of energy use, and
wherein Q3 is estimated using the logarithmic function method according to Equation 3:

$$Q3=Q2+\ln(a(t3-t2)+1),\qquad\text{[Equation 3]}$$

where the value of "a" is determined based on the hourly change of energy use.

9. The method of claim 8, wherein estimating the amount of energy use or energy cost comprises:
   calculating a sum of energy cost per hour and a variation rate of the energy cost per hour based on the received energy use information; and
   estimating the amount of energy use or energy cost after the certain time based on the calculated sum of energy cost and variation rate.

10. The method of claim 8, further comprising:
    controlling the supply of energy for at least one of the plurality of appliances according to the estimated amount of energy use or energy cost.

11. The method of claim 10, further comprising:
    transmitting a device control signal to a power switching device to turn one or more of the plurality of appliances on or off.

12. The method of claim 10, further comprising:
    transmitting at least the estimated amount of energy use or energy cost to the central server via a communication network.

13. The method of claim 12, further comprising:
    transmitting at least the estimated amount of energy use or energy cost to a user mobile terminal or an In Home Display (IHD).

14. The method of claim 13, further comprising:
    transmitting a warning message to the user mobile terminal or the IHD when the estimated amount of energy use or energy cost is greater than an upper threshold value.

* * * * *